United States Patent
Saleh et al.

(10) Patent No.: US 6,982,974 B1
(45) Date of Patent: *Jan. 3, 2006

(54) METHOD AND APPARATUS FOR A REARRANGEABLY NON-BLOCKING SWITCHING MATRIX

(75) Inventors: Ali Najib Saleh, Ft. Lauderdale, FL (US); Douglas E. Duschatko, McKinney, TX (US); Lane Bryon Quibodeaux, Allen, TX (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/477,166

(22) Filed: Jan. 4, 2000

Related U.S. Application Data

(63) Continuation-in-part of application No. 09/232,395, filed on Jan. 15, 1999.

(51) Int. Cl.
  H03K 17/00    (2006.01)
  H04Q 11/00    (2006.01)
  H04L 12/56    (2006.01)

(52) U.S. Cl. .................. 370/386; 370/389; 340/2.2
(58) Field of Classification Search .............. 370/386, 370/387, 388, 389, 392, 393, 394, 352, 357, 370/422, 398; 340/2.1, 2.2, 2.22, 2.24, 2.26, 340/2.27, 2.28, 3.2, 3.21
See application file for complete search history.

(56) References Cited

U.S. PATENT DOCUMENTS 4,074,072 A * 2/1978 Christensen et al. ........ 370/388
4,470,139 A * 9/1984 Munter ....................... 370/363

(Continued)

FOREIGN PATENT DOCUMENTS

EP   0 802 697 A2   10/1997
EP   0 752 795 A2    1/1998

(Continued)

OTHER PUBLICATIONS

Ali Saleh; H. Michael Zadikian; Zareh Baghdasarian, Vahid Parsi, "A Method For Routing Information Over A Network", Jan. 15, 1999; Ser. No. 09/232,397. (Copy not enclosed.).

(Continued)

*Primary Examiner*—Hassan Kizou
*Assistant Examiner*—Timothy Lee
(74) *Attorney, Agent, or Firm*—Campbell Stephenson Ascolese LLP

(57) ABSTRACT

A switching apparatus is disclosed that employs a relatively simple and inexpensive switching matrix, but which avoids interruption of existing connections when connections are added or removed. The switching matrix switches errorlessly by controlling the point in time at which switching occurs. Using such a technique, switching can be performed without disturbing the connections already configured in the switching matrix, and so is referred to herein as being non-blocking. Optionally, the incoming data can be rearranged to provide a larger window of time in which the switching matrix can be switched. In the case of a switch using an optical backplane, this also allows more time for various components of the system (e.g., clock/data recovery units) to re-acquire lock. The switching apparatus includes a switching matrix and control circuitry. The switching matrix has a matrix input, a control input and a number of matrix outputs, and is configured to receive an information stream at the matrix input. The information stream includes a number of portions, while the control circuitry has a control output coupled to the control input. The control circuitry is configured to initially configure the switching matrix to output the information stream at a one of the matrix outputs and to subsequently configure the switching matrix to output the information stream at another of the matrix outputs during a period of time during which the one of the portions is transiting the switching matrix.

35 Claims, 22 Drawing Sheets

U.S. PATENT DOCUMENTS

| | | | |
|---|---|---|---|
| 4,683,564 A * | 7/1987 | Young et al. | 370/380 |
| 5,084,891 A | 1/1992 | Ariyavisitakul et al. | 371/42 |
| 5,168,492 A * | 12/1992 | Beshai et al. | 370/353 |
| 5,200,746 A * | 4/1993 | Yoshifuji | 340/2.22 |
| 5,307,342 A | 4/1994 | Georigiou et al. | 370/58.1 |
| 5,357,249 A | 10/1994 | Azaren et al. | 341/100 |
| 5,410,600 A * | 4/1995 | Toy | 380/268 |
| 5,459,718 A | 10/1995 | Kusano | 370/16 |
| 5,657,449 A | 8/1997 | Osaki | 370/357 |
| 5,777,761 A | 7/1998 | Fee | 359/110 |
| 6,145,024 A | 11/2000 | Maezawa et al. | 710/14 |
| 6,160,813 A * | 12/2000 | Banks et al. | 370/422 |
| 6,188,686 B1 * | 2/2001 | Smith | 370/388 |
| 6,208,667 B1 | 3/2001 | Caldara et al. | 370/503 |
| 6,266,333 B1 * | 7/2001 | Kartalopoulos | 370/395.53 |
| 6,307,653 B1 | 10/2001 | Bala et al. | 359/110 |

FOREIGN PATENT DOCUMENTS

| | | |
|---|---|---|
| WO | WO 97/04397 | 2/1997 |
| WO | WO 97/24901 | 7/1997 |

OTHER PUBLICATIONS

H. Michael Zadikian; Steven E. Plote, John C. Adler, David Parish Autry, Ali Saleh, "Method of Providing Network Services", Jan. 4, 2000; Ser. No. 09/477,498. (Copy not enclosed).

Ali Saleh, "A Method For Path Selection In A Network", Jan. 4, 2000; Ser. No. 09/478,235. (Copy not enclosed).

Ali N. Saleh and Stevan E. Plote, "A Network Addressing Scheme For Reducing Protocol Overhead In An Optical Network", Sep. 2, 1999; Ser. No. 09/389,302. (Copy not enclosed.).

Ali Saleh, H. Michael Zadikian; John C. Adler, Zareh Baghdasarian, Vahid Parsi, "Configurable Network Router", Jan. 15, 1999; Ser. No. 09/232,395. (Copy not enclosed.).

H. Michael Zadikian, Ali Saleh; John C. Adler, Zareh Baghdasarian, Vahid Parsi, "Configurable Network Router", Jan. 15, 1999; Ser. No. 09/232,396. (Copy not enclosed.).

H. Michael Zadikian, Ali Saleh; John C. Adler, Zareh Baghdasarian, Vahid Parsi, "A Resource Management Protocol For A Configurable Network Router", Jan. 4, 2000; Ser. No. 60/174,323. (Copy not enclosed.).

Ronald Alan Russell and Michael Kevin Anthony, "A Method And Apparatus For Isolating Faults In A Switching Matrix", Jan. 4, 2000; Ser. No. 09/477,217. (Copy not enclosed.).

Komine, et al., "A Distributed Restoration Algorithm for Multiple–Link and Node Failures of Transport Networks," *IEEE, Globecom '90*, Apr. 1990.

Zhang, et al., "On Fundamental Issues in IP Over WDM Multicast," *IEEE, Computer Communications and Networks*, Sep. 1999.

* cited by examiner

| | | | |
|---|---|---|---|
| A1 1502 | A2 1504 | J0 Z0 1506 U | Payload Bytes 1590 |
| B1 1510 | E1 U 1512 | F1 U 1514 | Payload Bytes 1591 |
| D1 U 1520 | D2 U 1522 | D3 U 1524 | Payload Bytes 1592 |
| H1 1530 | H2 1532 | H3 1534 | Payload Bytes 1593 H4 1536 |
| B2 U 1540 | K1 U 1542 | K2 U 1544 | Payload Bytes 1594 |
| D4 U 1550 | D5 U 1551 | D6 U 1552 | Payload Bytes 1595 |
| D7 1553 | D8 U 1554 | D9 U 1555 | Payload Bytes 1596 |
| D10 U 1556 | D11 U 1557 | D12 U 1558 | Payload Bytes 1597 |
| S1 Z1 1570 U | M1 Z2 1572 U | E2 U 1574 | Payload Bytes 1598 |

SONET Frame 1500

Fig. 15
(Prior Art)

METHOD AND APPARATUS FOR A REARRANGEABLY NON-BLOCKING SWITCHING MATRIX

CROSS-REFERENCES TO RELATED APPLICATIONS

This application is a continuation-in-part of patent Application Ser. No. 09/232,395, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors. This application is hereby incorporated by reference, in its entirety and for all purposes.

This application is related to patent application Ser. No. 09/232,397, filed Jan. 15, 1999, and entitled "A METHOD FOR ROUTING INFORMATION OVER A NETWORK," having A. N. Saleh, H. M. Zadikian, Z. Baghdasarian, and V. Parsi as inventors; patent application Ser. No. 09/232,396, filed Jan. 15, 1999 and entitled "METHOD OF ALLOCATING BANDWIDTH IN AN OPTICAL NETWORK," having H. M. Zadikian, A. Saleh, J. C. Adler, Z. Baghdasarian, and V. Parsi as inventors; patent application Ser. No. 60/174,323, filed herewith, and entitled "A RESOURCE MANAGEMENT PROTOCOL FOR A CONFIGURABLE NETWORK ROUTER" having H. M. Zadikian, A. Saleh, J. C. Adler, Z. Baghdasarian and Vahid Parsi as inventors; patent application Ser. No. 09/477,217, filed herewith, and entitled "FAULT ISOLATION IN A SWITCHING MATRIX," having R. A. Russell and M. K. Anthony as inventors; patent application Ser. No. 09/389,302, filed September 2, 1999, and entitled "NETWORK ADDRESSING SCHEME FOR REDUCING PROTOCOL OVERHEAD IN AN OPTICAL NETWORK," having A. Saleh and S. E. Plote as inventors; patent application Ser. No. 09/478,235, filed herewith, and entitled "A METHOD FOR PATH SELECTION IN A NETWORK," having A. Saleh as inventor; patent application Ser. No. 09/477,498, filed herewith, and entitled "METHOD OF PROVIDING NETWORK SERVICES," having H. M. Zadikian, S. E. Plote, J. C. Adler, D. P. Autry, and A. Saleh as inventors. These related applications are hereby incorporated by reference, in their entirety and for all purposes.

BACKGROUND OF THE INVENTION

1. Field of the Invention

This invention relates to the field of information networks, and more particularly relates to switching matrices used in routing information through such information networks.

2. Description of the Related Art

Today's networks carry vast amounts of information. High bandwidth applications supported by these networks include streaming video, streaming audio, and large aggregations of voice traffic. In the future, these bandwidth demands are certain to increase. This information must be quickly and efficiently distributed to various destinations without the introduction of errors. Many modern networking topologies employ a switching matrix of some kind to perform this function.

For example, certain networks employ a point-to-point topology in which each node is coupled to another node by one or more connections. The easiest way to interconnect a group of N nodes is by using an N×N crossbar switch. One advantage is that such a scheme is strictly non-blocking. This means that a connection can be made between any unused input and any unused output, regardless of the current state of the switch. Thus, the switch can be reconfigured at any time without disturbing pre-existing connections. This is an important capability in many applications, such as data networks (e.g., errors causing retransmission of the damaged data and so reducing available bandwidth) and telephony networks (e.g., dropped telephone calls). However, a problem with N×N crossbar switches is that such a switch grows exponentially as connections are added, meaning that $N^2$ switches are required to build a network having N inputs and N outputs.

Many attempts have been made, some as early as the early 1900's, to reduce the cost of such interconnection networks. It was realized that by using two or more stages of smaller switching elements, or nodes, a less expensive solution could be achieved. Those attempts resulted in a number of multi-stage interconnection network (MIN) architectures. MIN architectures can generally be divided into three classes: blocking, rearrangeably non-blocking, and strictly non-blocking. These MIN architectures are still widely used today.

The first class of multi-stage interconnection networks is the blocking network. This class of networks, which includes Banyan networks, Omega networks, n-Cube networks, and others, is characterized by the property that there is only one path from any input to any output. Because some of the paths share one or more links within the MIN, a high number of permutations cannot be routed when using such networks. Some blocking networks can be made rearrangeably non-blocking (the next class of MIN) by inserting an additional stage at the output.

The second class of MIN architectures is the rearrangeably non-blocking network. Rearrangeably non-blocking networks allow idle pairs of input and output ports to be connected after possibly rearranging some of the existing connections (i.e., reconfiguring the switching matrix). Unfortunately, information carried on some or all of the existing connections may experience errors during the switching matrix's reconfiguration. Benes and some forms of the Clos-type switching matrix are examples of rearrangeably non-blocking networks.

The third class of networks is the strictly non-blocking network. This class of networks allows any idle pair of input and output ports to be connected without having to rearrange any of the existing connections. This is true regardless of the current state of the network (i.e., input-output pairing). No errors are experienced on the existing connections during the switching matrix's reconfiguration in such a MIN.

Each class of MIN provides different advantages. The less "blocking" a network is, generally, the more complex that network will be because more internal connections are required to ensure that paths through the MIN are not blocked. For example, the number of cross-points required in one type of Clos MIN is $6N^{3/2}-3N$, whereas a crossbar network requires $N^2$ crosspoints. Table 1 lists the number of cross-points required for the two types of networks, for various values of N.

TABLE 1

Number of required crosspoints for the Clos and crossbar networks.

| N | Crossbar | Clos Network | Difference |
|---|---|---|---|
| 32 | 1024 | 990 | 34 |
| 36 | 1296 | 1188 | 108 |
| 64 | 4096 | 2880 | 1,216 |

TABLE 1-continued

Number of required crosspoints for the Clos and crossbar networks.

| N | Crossbar | Clos Network | Difference |
|---|---|---|---|
| 128 | 16,384 | 8,305 | 8,079 |
| 256 | 65,536 | 23,808 | 41,728 |

Table 1 makes the size advantages of a rearrangeably non-blocking network (e.g., a Clos-type MIN) over a strictly non-blocking network (e.g., a crossbar switch) readily apparent. It will be noted that the difference between the two networks tends to grow more quickly as N grows beyond 36.

However, in most network applications, some sort of non-blocking matrix is preferred, in order to maintain throughput. This is especially true for telephony applications (e.g., voice circuits). Once established, a voice circuit should not be interrupted until the circuit is terminated, and, in fact, interruptions longer than a few tens of milliseconds are not well-tolerated by modern telephony systems. Thus, traditional blocking or rearrangeably non-blocking networks are not appropriate for such applications, despite their greater simplicity and lower cost.

SUMMARY OF THE INVENTION

Embodiments of the present invention overcome conventional limitations by providing a switching matrix and method of operation that are relatively simple and inexpensive, but that avoid interruption of existing connections when connections are added or removed. In one embodiment, a method and apparatus according to the present invention provide a switching matrix that switches errorlessly by controlling the point in time at which switching occurs. Using such a method, switching can be performed without disturbing the connections already configured in the switching matrix, and so is referred to herein as being non-blocking. Optionally, the incoming data can be rearranged to provide a larger window of time in which the switching matrix can be switched. In the case of a switch using an optical backplane, this also allows more time for various components of the system to re-acquire lock (e.g., clock/data recovery units).

Such a switching arrangement can be used, for example, in a network element to support relatively simple provisioning and relatively fast restoration (on the order of, for example, 50 ms), while providing relatively efficient bandwidth usage (i.e., minimizing excess bandwidth requirements for restoration, on the order of less than 100% redundant capacity and preferably less than 50% redundant capacity). Such a network element is, in one embodiment, based on an architecture that can be easily scaled to accommodate increasing bandwidth requirements.

According to one embodiment of the present invention, a method of operating a switch matrix is disclosed. The method includes configuring the switch matrix to couple a first input to a first output, receiving an information stream at the first input, and reconfiguring the switch matrix during a first time period. The information stream contains a number of portions in a sequence, with one of the portions in a position in the sequence and the first time period corresponding to that position in the sequence. The reconfiguring couples the first input to a second output.

In one aspect of the embodiment, the method also includes re-arranging certain of the portions of the information stream such that the one of the portions is in another position in the sequence. In the case where the first portion contains network protocol overhead, and the information stream is carried by a signal, a method according to the embodiment may include loading the one of the portions with a value, the value enabling the matrix to synchronize with the signal more easily.

In another aspect of the embodiment, the method also includes re-arranging certain of the portions prior to receiving those portions such that the number of the portions are in a set of contiguous positions. In this case, the first time period corresponds instead to the set of contiguous positions. It will be noted that, in this aspect, a number of the portions are in various positions in the sequence, and include the portion previously discussed. This aspect may also include re-arranging those certain portions such that the portions are returned to their original positions.

According to another embodiment of the present invention, a method of operating a switch matrix is described that includes configuring the switch matrix to couple a number of inputs to a number of outputs, receiving a number of information streams at the inputs and reconfiguring the switch matrix during the switching period.

In this embodiment, each one of the information streams includes a number of portions in a sequence and is received at a corresponding one of the inputs. For each one of the information streams, that portion is in a specific position of the sequence, and a time period during which that portion transits the switching matrix is at least minimally concurrent with the time period for each of the other portions of the information streams. The time period of minimal concurrency defines a switching period. For certain of the information streams, the re-arranging performed re-arranges certain of the portions such that the given portion is moved to another position in the sequence of the information streams in order to achieve the minimal concurrency.

According to one aspect of the embodiment, the time period of minimal concurrency is such that, for the each one of the information streams, a leading edge of the given portion has been output from a corresponding output before a trailing edge of the portion is received at a corresponding input. According to another aspect of the embodiment, for certain ones of the information streams, a number of the portions are in various positions in the sequence. In this scenario, the portions include the given portion. In this aspect, the method also includes, again for those certain information streams, re-arranging certain of the portions prior to receiving, such that the portions are in a set of contiguous positions. A group time period during which the portions transit the switching matrix is at least minimally concurrent with the group time period for each of the other information streams is defined therefor.

According to still another embodiment of the present invention, a switching apparatus is disclosed. The switching apparatus includes a switching matrix and control circuitry. The switching matrix has a matrix input, a control input and a number of matrix outputs, and is configured to receive an information stream at the matrix input. The information stream includes a number of portions, while the control circuitry has a control output coupled to the control input. The control circuitry is configured to initially configure the switching matrix to output the information stream at a one of the matrix outputs and to subsequently configure the switching matrix to output the information stream at another of the matrix outputs during a period of time during which the one of the portions is transiting the switching matrix.

According to one aspect of the embodiment of the present invention, the switching apparatus also includes an input resequencing circuit having a resequencer input and a resequencer output, and coupled to the matrix input. In this aspect, the input resequencing circuit is configured to receive the information stream at the resequencer input, to rearrange certain of the portions such that one of the portions is moved from an original position in an original sequence of the portions to another position in the original sequence in order to produce a modified sequence of the portions, and to provide the information stream to the switching matrix at the input resequencer output. This aspect can also include a first output resequencing circuit and a second output resequencing circuit. The first output resequencing circuit is coupled to the one of the matrix outputs. In this aspect, the first output resequencing circuit is configured to move the one of the portions from an original position in the modified sequence to a position in the modified sequence corresponding to the original position in the original sequence, while the second output resequencing circuit, coupled to the another of the matrix outputs, is configured to move the one of the portions from an original position in the modified sequence to a position in the modified sequence corresponding to the original position in the original sequence.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 15 illustrates a standard frame of the synchronous optical network protocol.

The use of the same reference symbols in different drawings indicates identical items unless otherwise indicated.

DETAILED DESCRIPTION OF THE INVENTION

Figure 1A:
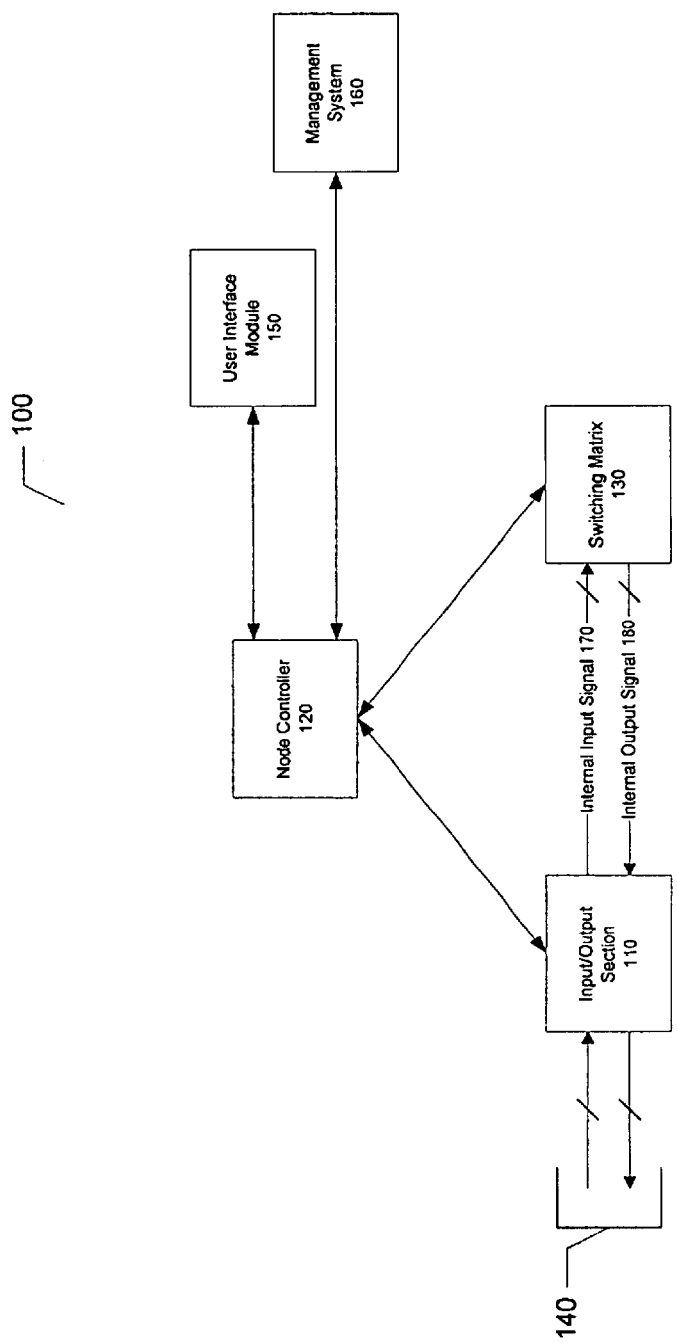
FIG. 1A is a block diagram of an exemplary router.

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Introduction

A switching matrix according to the present invention is relatively simple and inexpensive, yet avoids interruption of existing connections when connections are added or removed. A method and apparatus according to one embodiment of the present invention provide a switching matrix that switches errorlessly by controlling the point in time at which switching occurs. A matrix rearrangement may be required to provision a new circuit, for example, and if rearrangement is required, it is important that any live channels already carrying traffic not experience errors in the communications being carried. The requirement to avoid disruption in the data on live channels drives the need to provide errorless rearrangement support in router according to an embodiment of the present invention.

Such a switching matrix is therefore switched at a point in the data stream in which no live data is being transmitted. Using such a method, switching can be performed without disturbing the connections already configured in the switching matrix. A switching matrix operated in this manner is therefore referred to herein as being non-blocking. Optionally, the incoming data can be rearranged to provide a larger window of time during which the switching matrix can be switched. A non-blocking switching matrix according to the present invention using such a technique is referred to herein as a rearrangeably non-blocking switching matrix. In the case of a switch using an optical backplane, this also allows more time for various components of the system to re-acquire phase lock (e.g., clock/data recovery units situated along the signal path).

This switching and relocking can be thought of in terms of a wavefront traveling through the signal path of router such as that described herein. The point at which switching and relocking may occur within the data stream is actually a given number of bit times. This "window" in the data stream travels through the router, with live data to either side, and is sequentially encountered by each element along the signal path through the router. During the time between when the beginning of the window and the end of the window is encountered by a given element, the element may switch, relock, or otherwise experience a disruption in the data stream without the disruption of the live data being carried.

To support this technique, the input/output connections to and from the matrix are preferably maintained during a matrix rearrangement, with only paths internal to the router's switching matrix being altered. To improve signal fidelity, the switching matrix incorporates several clock/data recovery units (CDRs) in the signal path from matrix input to matrix output. These CDRs are configured in a serial sequence through the matrix. As the window travels through the router (i.e., the serial data signal is disrupted (e.g., due to a switch change)), the CDRs re-acquire lock one at a time, in a serial fashion.

An Exemplary Network Element

FIG. 1A illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces (e.g., SONET), a user interface module 150, and a management system 160. Internal input signals 170 and internal output signals 180 may be electrical or optical in nature.

Figure 1B:
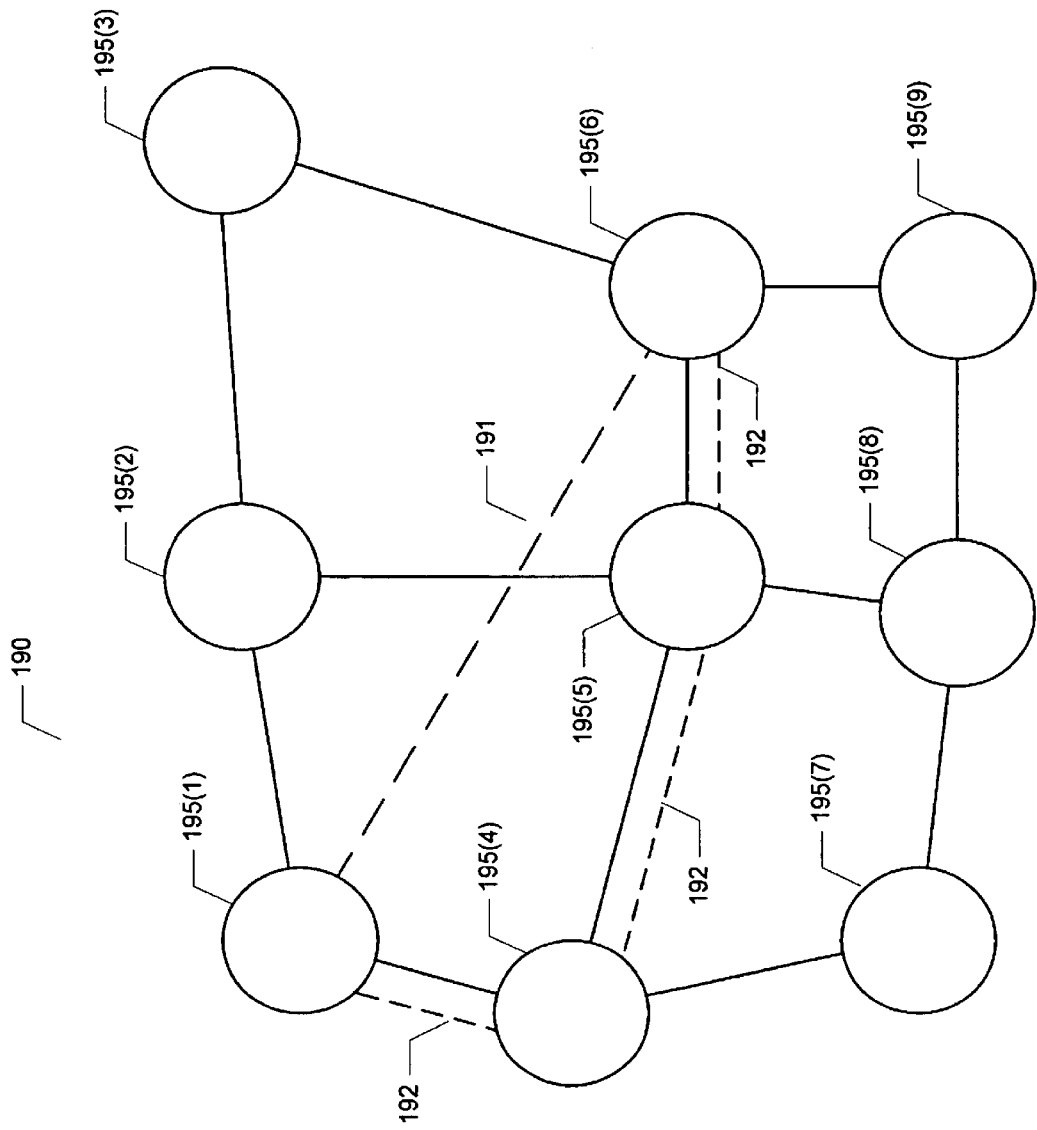
FIG. 1B is a block diagram of a network including a number of the routers of FIG. 1A.

FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

Among other benefits, router 100 solves three growth-related problems often encountered in today's information networks, and particularly in SONET networks:

1. Port capacity growth;
2. Bandwidth management; and
3. Efficient and fast restoration.

Router 100 is a multi-rack, fully redundant router that, in one embodiment, supports at least 256, 1+1 I/O ports, and provides 1-plus-1 protection by using multiple copies (e.g., two or more) of group and main matrices operating in 1+1 mode. Failures within one copy of a given matrix do not require a complete switchover to the backup copy. Only the affected paths through the matrix are switched to the backup copy. This greatly improves switching speed and minimizes the impact of such redundancy on other connections. Preferably, the group matrix is a 2:1 reduction stage that selects output signals from one of two line cards (also referred to herein as I/O modules, due to their functionality) and connects the selected output signals to the main matrix, thus preventing a non-working channel from consuming any ports on the main matrix.

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
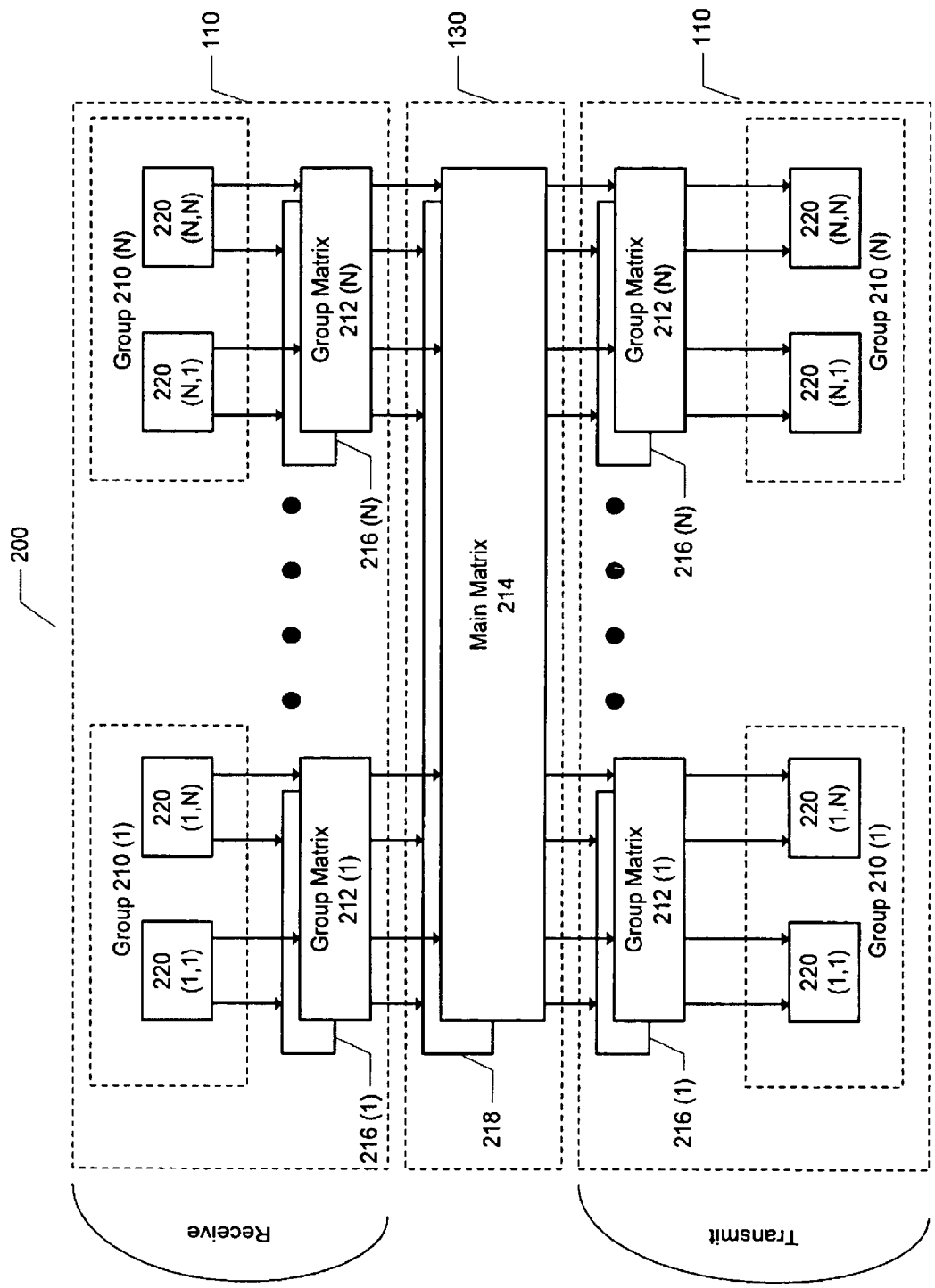
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1, N), through line cards 220(N,1)–(N,N). Signals from line cards 220(1, 1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1)–(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220(1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×17 switching elements that allow any of their inputs to be connected to any of their outputs, with the 17th output provided to permit fault detection within switching matrix 130. A single copy of the matrix may be housed, for example, in a single rack that contains three shelves, one for each column (or stage) of the matrix. Each one of such shelves contains cards housing the 16 switching elements in each stage. The switching element itself includes, for example, a 16×17 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1, 1)–(N,N) receive optical signals from group matrices 212(1)–(N) and 216 (1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
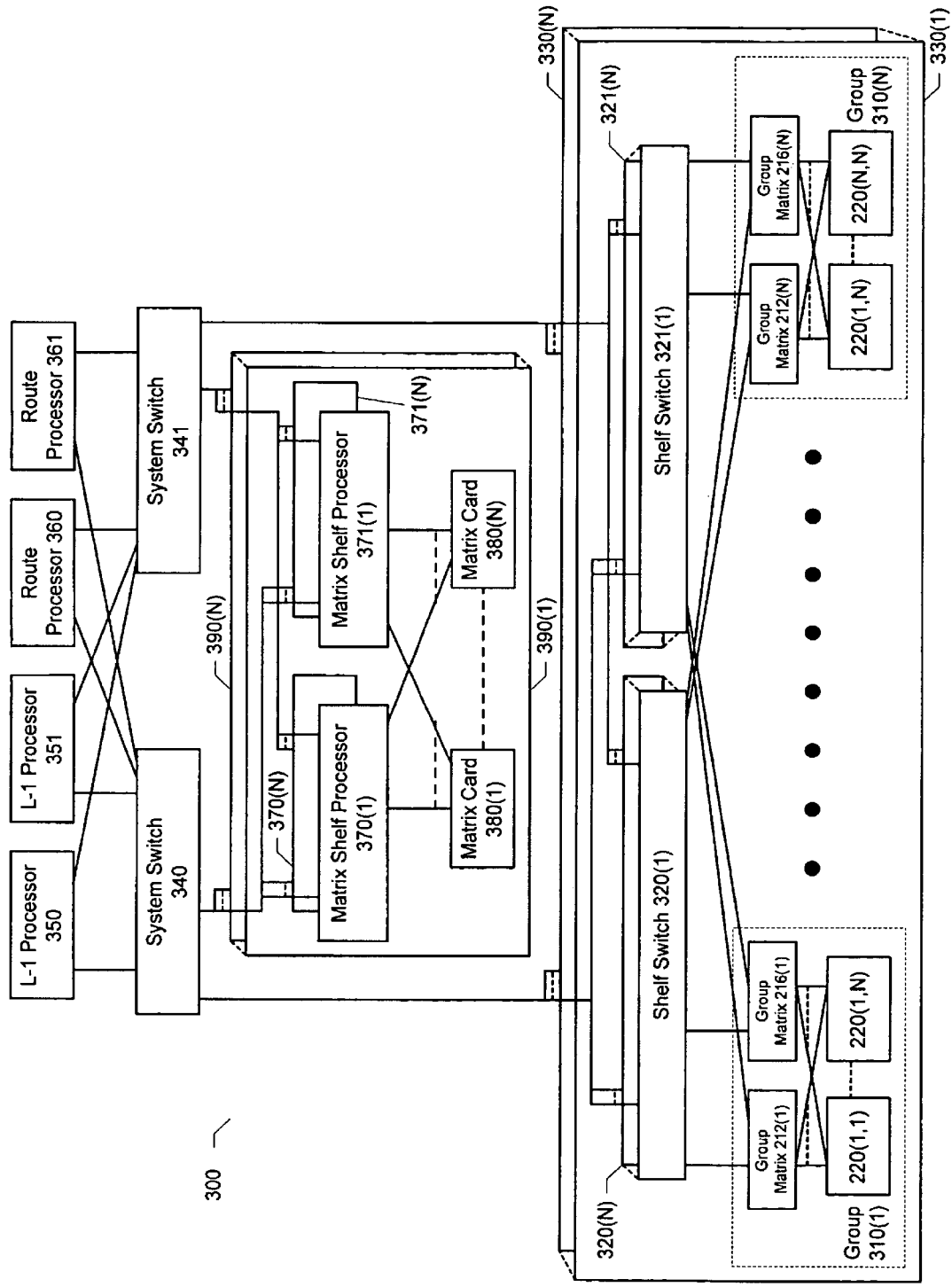
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10 BASE-T networking standard. The redundant connections from line cards 220(1,1)–(NN) in each of groups 310(1)–(N) are connected to two repeaters that reside on two separate copies of the group matrix module. Preferably, each one of line cards 220(1,1)–(N,N) supports two network ports (e.g., 10 BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(NN) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrices 212(1) and 216(1). Group matrices 212(1)–(N) and 216(1)–(N) each feed a signal into shelf switches 320(1)–(N) and 321(1)–(N) of FIG. 2. Shelf switches 320(1)–(N) and 321(1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320 (1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N).

It will be noted that main matrix 214 includes matrix cards 380(1,1)–(1,N), and that, more generally, main matrices 214 and 218 are included in matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

I/O Bay

An I/O bay can support, for example, a total of 16 slots. Slots may be logically divided into functional groups. In such an embodiment, four such functional groups are defined with three of the groups occupying five slots each. In that embodiment, the other group, which occupies a single slot can be configured to house the shelf processor. Thus, the I/O bay can contain line cards (exemplary of line cards 220 (1,1)–(N-N)) and group matrices (exemplary of group matrices 212 (1)–(N) and 216 (1)(N)) which are controlled by shelf processors (not shown in FIG. 3). It will be noted that the various line cards, group matrices, and shelf processors correspond to similar elements from previous figures.

Groups

A group is made up of line cards occupying a number of slots on a shelf. In one implementation, a group is 16 line cards occupying four slots plus a group matrix. Four of the slots hold, for example, the 16 line cards at 4 per slot. The same slot can be used with a wide variety of line cards and in various configurations. This architecture provides flexibility to allow any combination of line cards to be installed in each slot.

The fifth slot in the aforementioned embodiment can be configured to accept a group matrix. Preferably, two group matrix cards are employed, each containing a 2:1 optical reduction stage that "selects" working channels before the signals leave the shelf. In a 1+1 protection scheme, the two inputs to the line cards are classified as active and protect channels. The working channel is one of the active and protect channels that is selected based on bit error rate or other criteria, and so implements a redundancy scheme. This prevents the standby line cards from using any bandwidth on switching matrix 130.

Backplane

The following describes one embodiment of a backplane and some of the interface signals on that backplane. The backplane in the I/O bay shelf carries a variety of signals between line cards and other modules in the shelf. Each I/O shelf module is configured to allow an automatic, errorless switch from one power bus to the other.

Shelf processor module backplane signals include reset signals, clock signals, hardware detect signals (e.g., card detect, copy present, and the like), slot ID signals, and slot communication signals (both low and high speed). Line card backplane signals include reset signals, clock signals, communication signals, hardware detect signals, and slot ID signals. Group matrix module backplane signals include reset, clock signals, communication signals (both low and high speed), detection and hardware detect signals, and slot ID signals.

System Modules

Line Card

Figure 4:
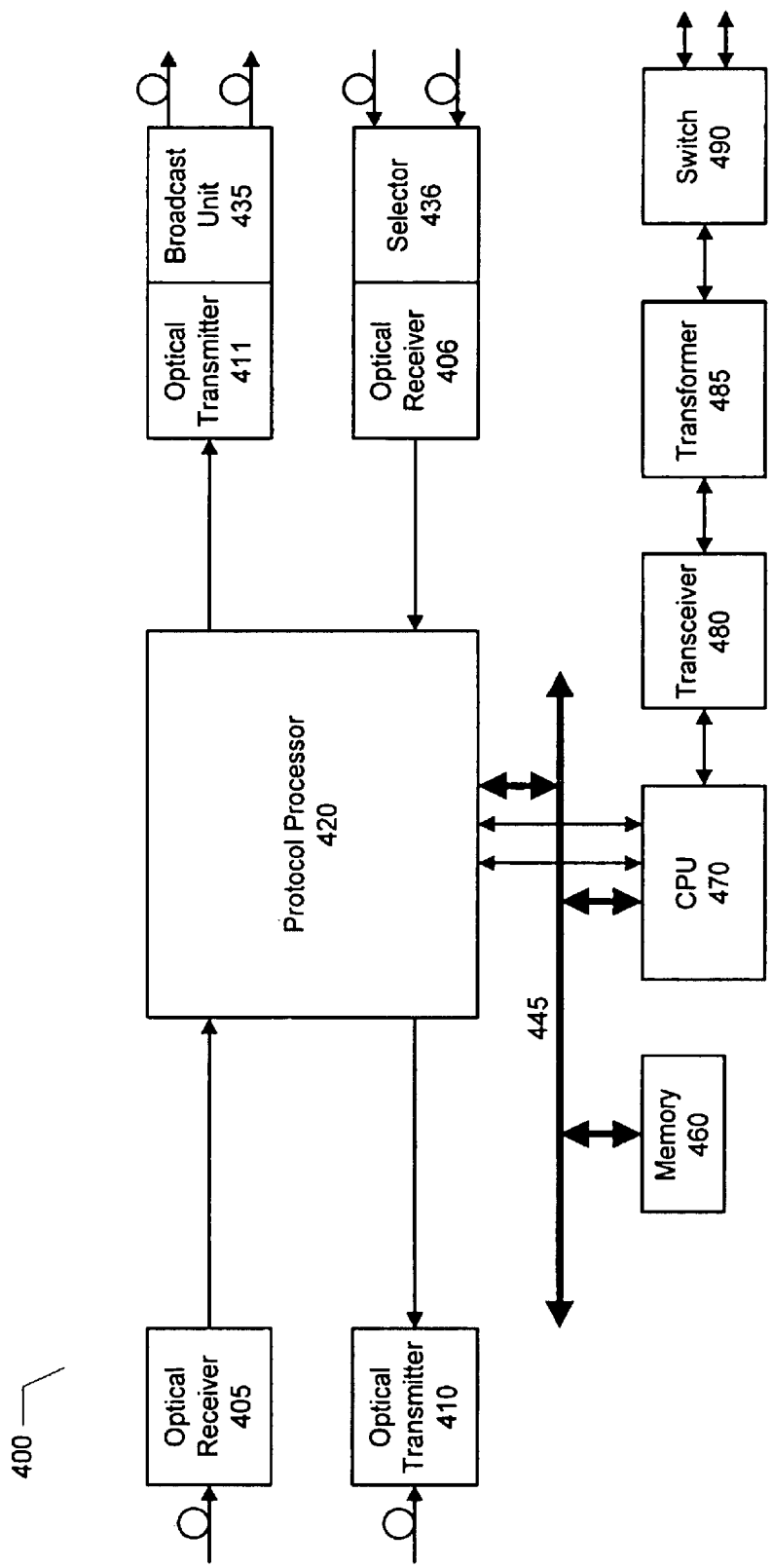
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer.

In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)–(NN) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Group Matrix Module

The group matrix module includes two independent blocks: a group matrix and a hub (also referred to herein as a repeater).

Group matrix

Figure 5:
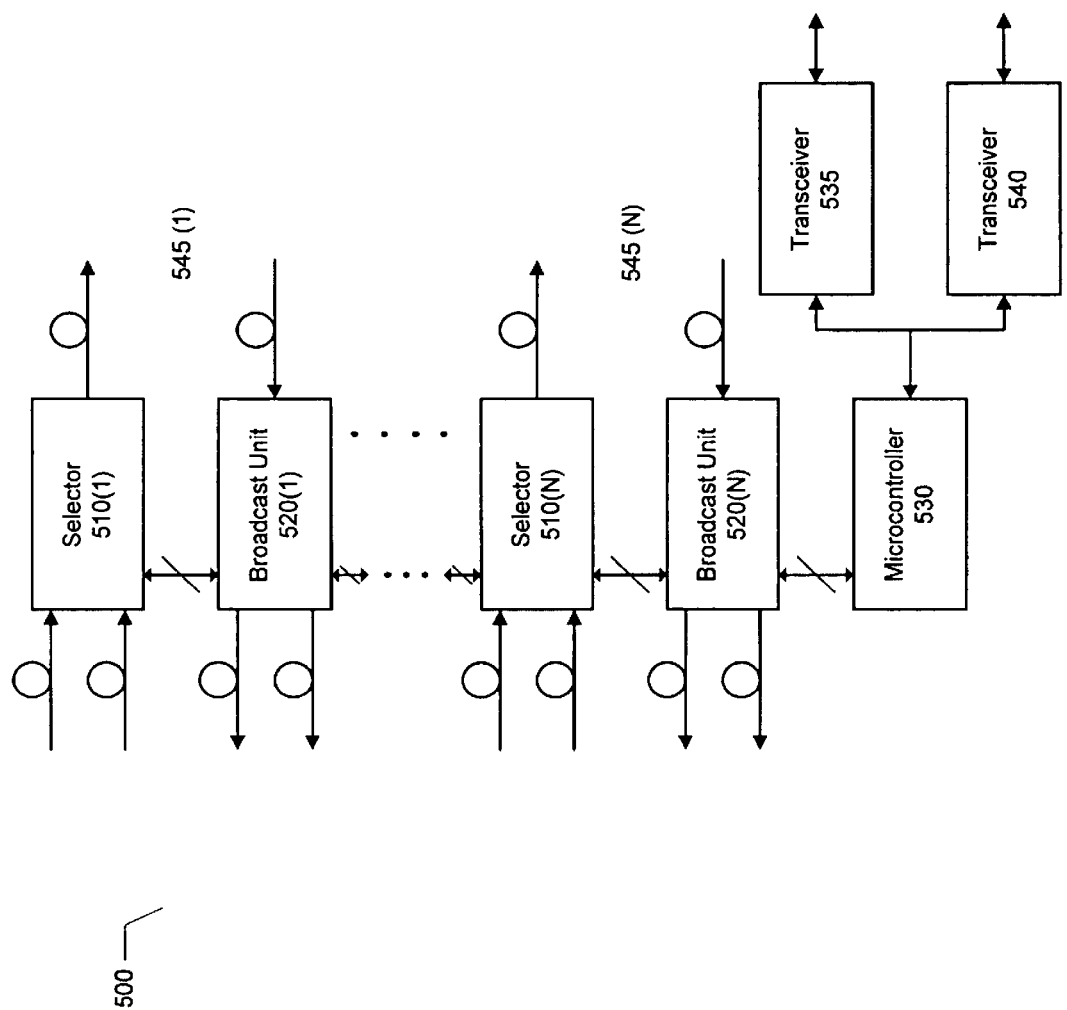
FIG. 5 illustrates an exemplary group matrix.

FIG. 5 illustrates an exemplary group matrix 500, which is exemplary of group matrices 212(1)–(N) and 216(1)–(N). In the embodiment shown in FIG. 5, group matrix 500 includes a series of 2:1 path selectors (exemplified by selectors 510(1)–(N)), broadcast units 520(1)–(N), and a microcontroller 530 controlling these. Selectors 510(1)–(N) select one of two full-duplex optical signals and couple the selected signal to switching matrix 130. Selectors 510(1)–(N) and broadcast units 520(1)–(N) are grouped into pairs to form I/O channels 545(1)–(N). Microcontroller 530 communicates with other elements of router 100 via redundant transceivers (exemplified by transceivers 535 and 540). For example, microcontroller 530 can control selectors 510(1)–(N) and broadcast units 520(1)–(N) through commands received from the group processor.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

The shelf processor module provides, among other elements, a shelf processor and switch that interconnect the LAN segments from the groups and the shelf processor to a port on the shelf switch (Ethernet switch 630).

Shelf Processor

Figure 6:
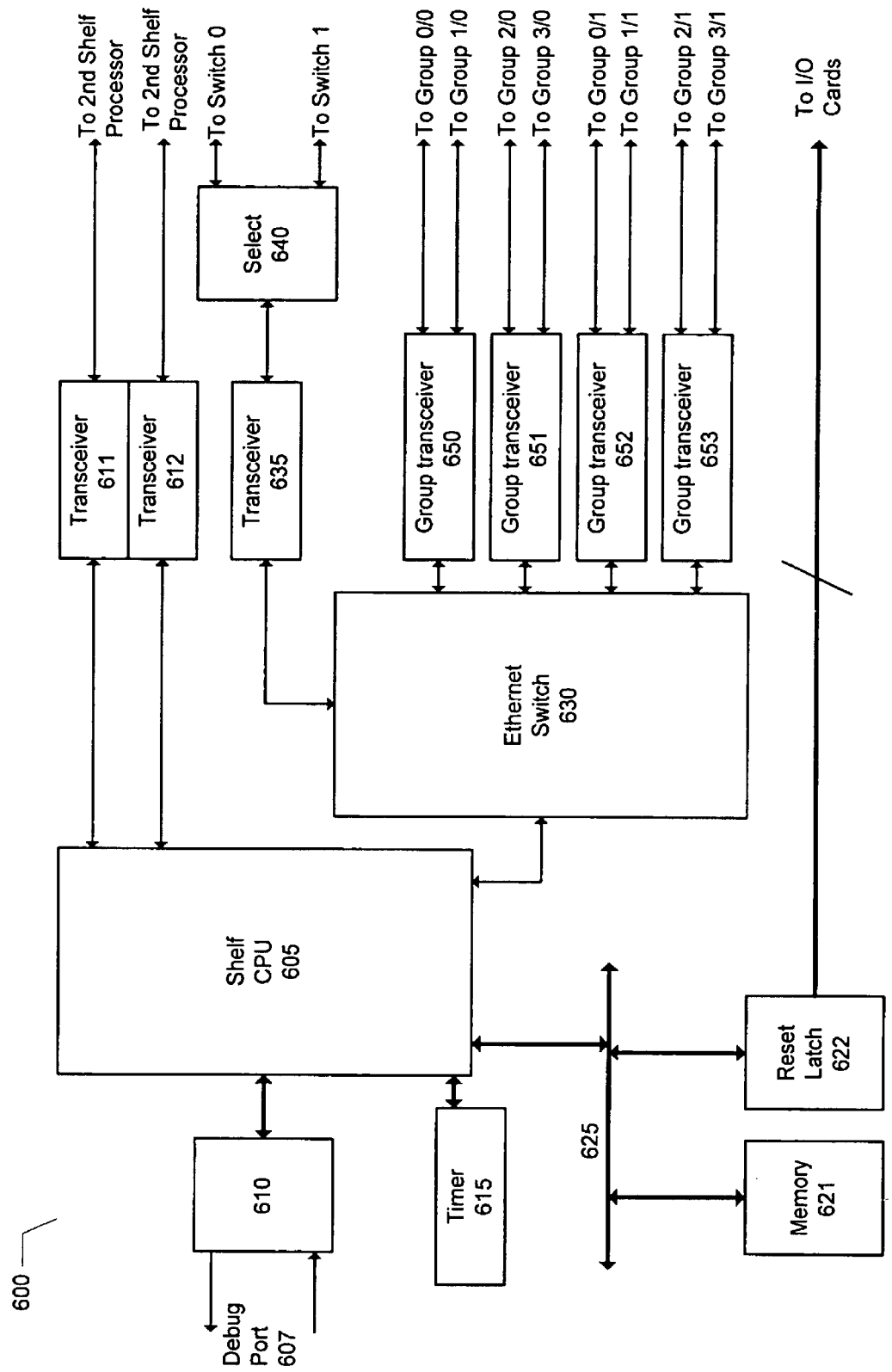
FIG. 6 illustrates a shelf processor which is responsible for the overall operation, management and control of a shelf.

FIG. 6 illustrates a shelf processor 600 which is responsible for the overall operation, management, and control of the shelf. A shelf CPU 605 controls the functions of shelf processor 600. Shelf CPU 605 is connected to a debug port 607 via a debug port transceiver 610. Debug port 607 may be a device capable of coupling shelf CPU 605 to a personal computer or dumb terminal. Debug port 607 allows a user to access shelf processor module 600 to determine the cause of any errors therein. Transceivers 611 and 612 each connect an SCC channel of shelf CPU 605 to the other shelf processor. The resulting link, which can use high-speed asynchronous framing, serves as an inter-processor communications interface.

Shelf CPU 605 is also connected to a timer 615, which preferably contains the following three functional blocks:

1. Power-fail-reset
2. External reset
3. Timer

Shelf CPU 605 also accesses a memory 621 and a reset latch 622 over a CPU bus 625. Reset latch 622 supports reset of one or more cards (not shown). Shelf CPU 605 is also coupled to an Ethernet switch 630. The network switch interconnects the lower speed inter-processor communication network segments in each shelf. In one embodiment, the network switch provides support for 10 Mbps and 100 Mbps segments. In one embodiment, an integrated bus master and slave interface allow multiple devices to be interconnected.

Ethernet switch 630 is coupled to a transceiver 635 which, via a select 640, allows Ethernet switch 630 to connect to two separate Ethernet segments. Select 640 implements a 1:1 protection scheme that allows shelf processor 600 to recover from failures on the active segment by simply switching to the other segment. Ethernet switch 630 is also coupled to one or more group transceivers (exemplified by group transceivers 650, 651, 652, and 653). Group transceivers 650, 651, 652, and 653 connect ports on Ethernet switch 630 to the groups.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/system Controller

Figure 7:
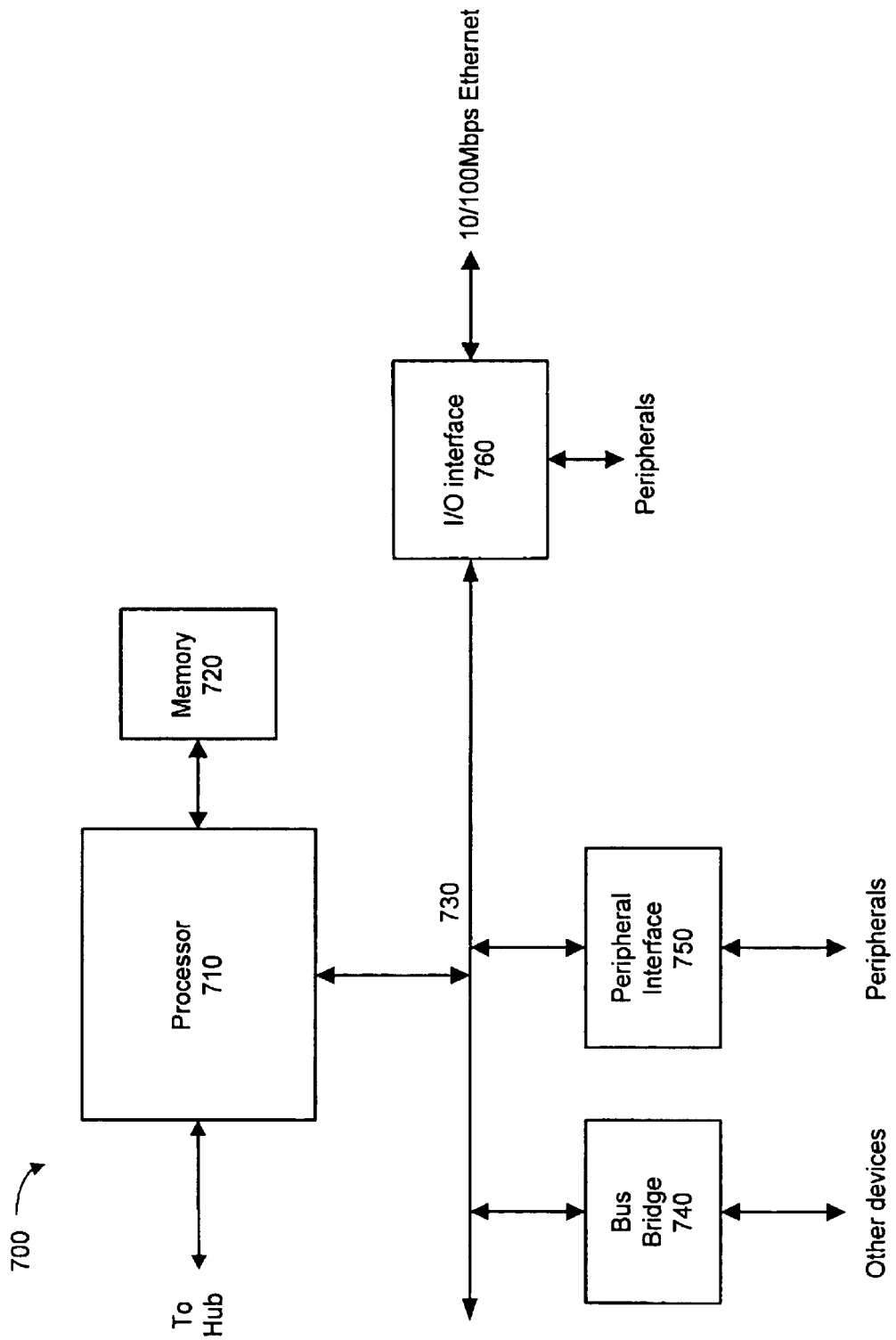
FIG. 7 illustrates a shelf processor which is responsible for the overall operation, management and control of a shelf.

FIG. 7 illustrates a system controller 700 (also referred to herein as a level-1 processor). The core of the system controller 700 is a processor 710, which also communicates with the system switches (i.e., system switches 340 and 341). Programs run on processor 710 are stored in memory 720 coupled thereto. Processor 710 is also coupled to an all-purpose bus (APB) 730, which in turn drives several bus and communications controllers. Among the controllers interfaced to APB 730 is a bus bridge 740, a peripheral interface 750, and an I/O interface 760. I/O interface 760 may provide functionality such as 10 Mbps/100 Mbps Ethernet communications. I/O interface 760 also supports peripherals such as keyboards, mice, floppy drives, parallel ports, serial ports, and the like. Bus bridge 740 allows communications between processor 710 and other devices. Peripheral interface 750 allows communications with peripherals such as hard disks. The level 1 processor performs various functions, such as communicating with the route processor(s) to determine how the matrix should be configured, managing the router's resources, and similar duties.

APB 730 may also be connected to a dual-channel serial communication controller (SCC), which is used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the level-1 processor.

Route Processor Module

Figure 8:
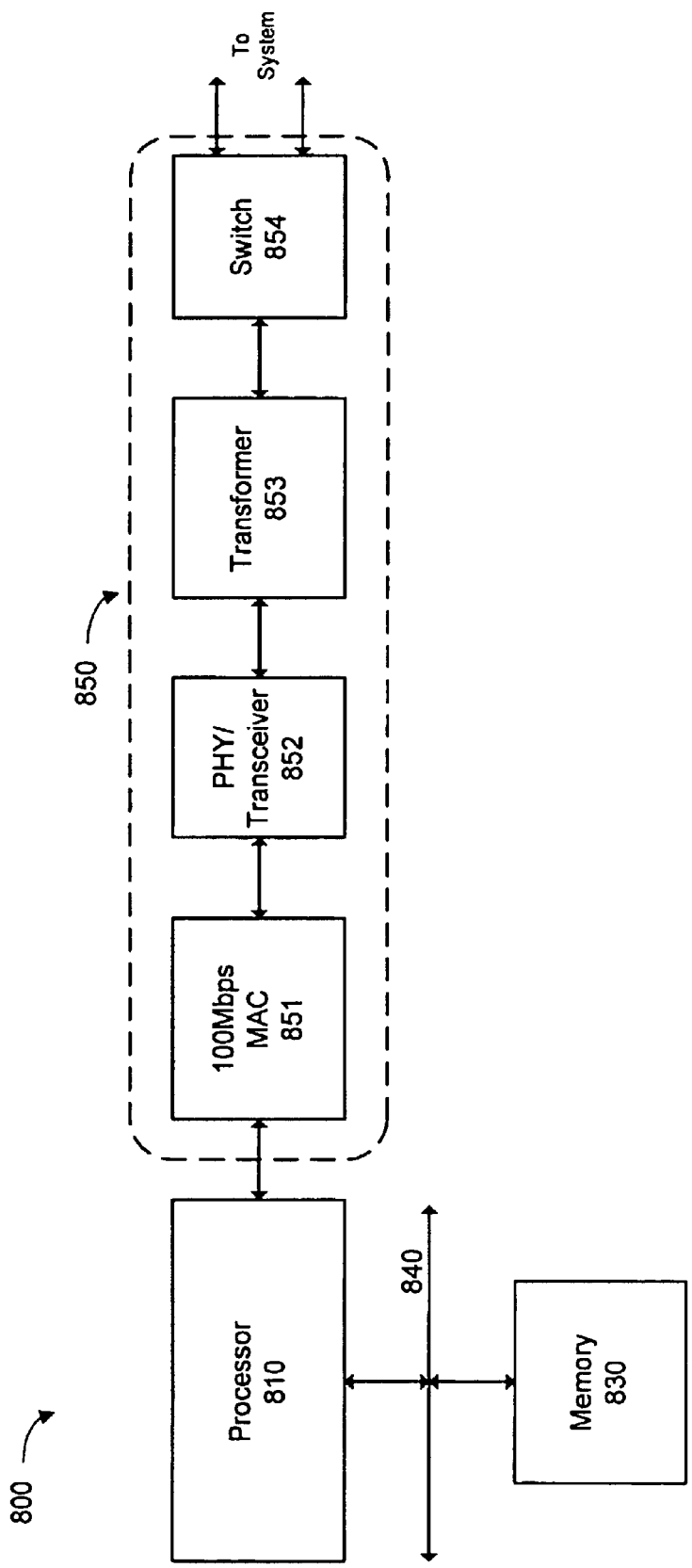
FIG. 8 illustrates a route processor.

FIG. 8 illustrates a route processor 800. Route processor 800 is a high-speed processor subsystem with relatively limited I/O capabilities. Route processor 800 functions to receive link-failure indications from the line cards (not shown), computes an alternate route for failed connections using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. Route processor 800 is able to communicate directly with all system modules, including the line cards (not shown) and the matrix shelf processors (not shown) via a redundant high speed network connection to the system switch. In systems using Ethernet as the communication mechanism, route processor 800 communicates with these elements via a redundant 100 Mbps connection to the system Ethernet switch. The core of route processor 800 is a processor 810 which runs software stored in memory 830 via a CPU bus 840. As noted, the software implements a routing protocol such as that mentioned above. Processor 810 communicates with other systems of router 100 using an Ethernet communications mechanism via a 100 Mbps Ethernet transceiver 850. Ethernet transceiver 850 is depicted in FIG. 8 as including a 100 Mbps MAC 1151, a PHY/transceiver 852, a transformer 853 and a switch 854. Switch 854 provides a redundant connection to the other systems of router 100 to allow uninterrupted operation in the event of a communications failure.

System Switch

Figure 9:
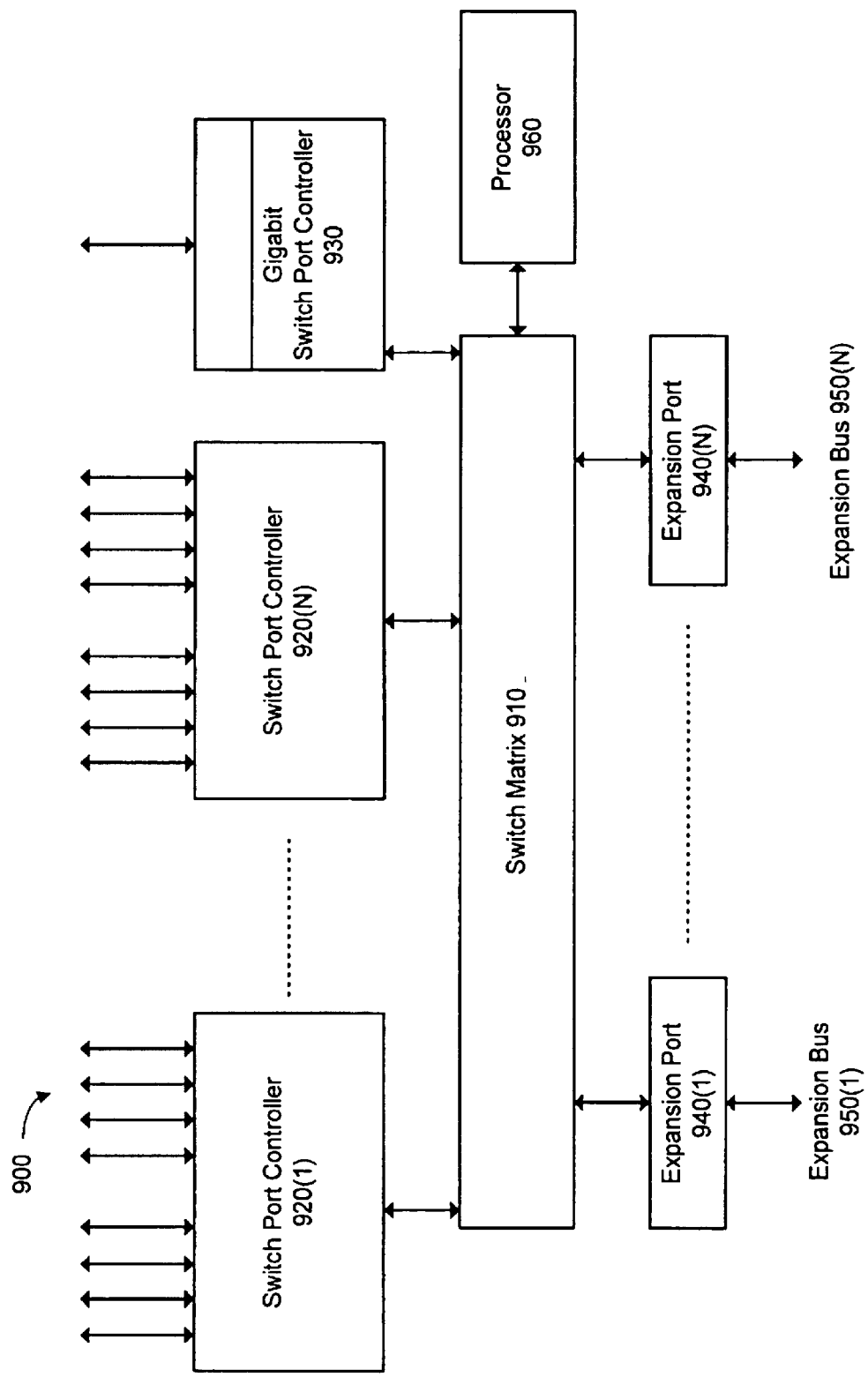
FIG. 9 illustrates an example of a system switch.

FIG. 9 illustrates an example of a system switch depicted as a system switch 900, which can use an Ethernet-based communications, for example. In an Ethernet configuration, system switch 900 manages the Ethernet connections from all level-1, level-2, route, and optional Wide Area Network (WAN) processors (not shown). System switch 900 implements a high-speed, low-latency Ethernet switch that isolates local traffic to individual segments. The core of system switch 900 is a switch matrix 910. In one embodiment, switch matrix 910 is an eight port bus that interconnects switch port controllers 920(1)–(N), one or more high-speed interfaces (exemplified by a gigabit Ethernet switch port controller 930), and expansion ports 940(1)–(N). Each one of expansion ports 940(1)–(N) communicates with a corresponding one of expansion buses 950(1)–(N), respectively. Switch matrix 910 is controlled by a processor 960. Each copy of system Ethernet switch 900 thus supports communications with level-1 processors, route processors, each I/O bay, and each matrix shelf processor. In Ethernet-based systems, these connections may be by 100 Mbps or 10 Mbps connections.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Matrix Shelf Processor Module

The matrix shelf processor module provides local control and management for one of the main-matrix shelves. The matrix shelf processor communicates with the level-1 and route processors over a low speed network connection and with the matrix node cards over a multi-drop, low-speed bus.

Figure 10:
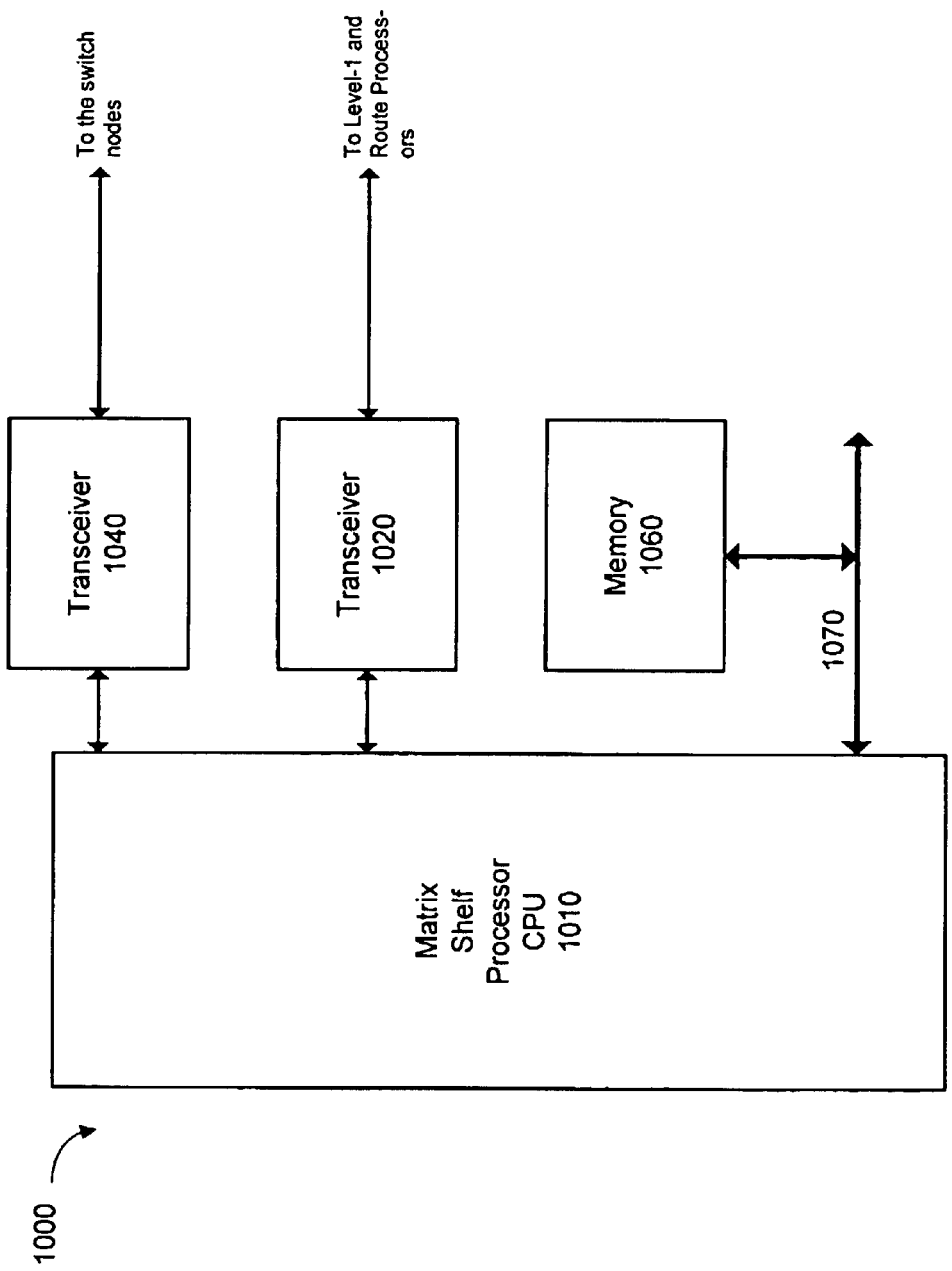
FIG. 10 illustrates a matrix shelf processor.

FIG. 10 illustrates a matrix shelf processor 1000, which is illustrative of a processor such as shelf processor 600 of FIG. 6. Matrix shelf processor 1000 provides local control and management for one of the shelves of a main matrix such as switching matrix 130 (FIG. 1). The core of matrix shelf processor 1000 is a matrix shelf processor CPU 1010. Matrix shelf processor CPU 1010 communicates with one or more level-1 processors (not shown) and route processors (not shown) via a transceiver 1020 (preferably a 10 BASE-T transceiver). Matrix shelf processor CPU 1010 communicates with the system switches (i.e., system switches 340 and 341) via a transceiver 1040. To support these functions, matrix shelf processor CPU 1010 is coupled via a processor bus 1070 to memory 1060 which provides storage for various software modules run by matrix shelf processor CPU 1010.

Main Matrix

Figure 11:
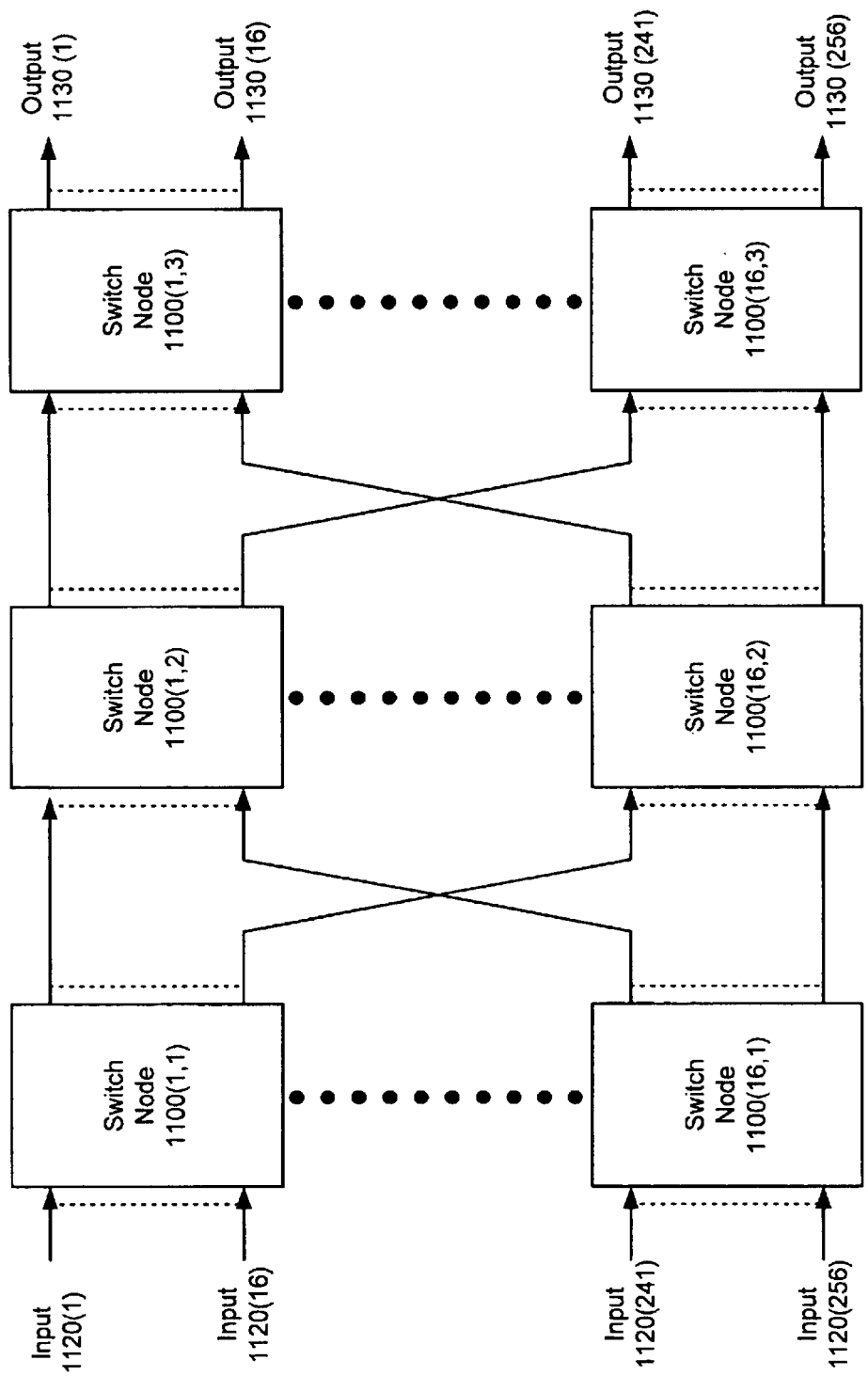
FIG. 11 illustrates the structure of a switching matrix.

FIG. 11 illustrates switching matrix 130 configured in the manner of the switch matrix described previously. In one embodiment, switching matrix 130 employs a 256×256 matrix, an array of switching nodes 1100(1,1)–(16,3), each of which is a 16×16 crossbar switch that allows any input signal to be connected to any of its outputs, regardless of the current state of the crossbar. Each of the interconnections between switching nodes 1100(1,1)–(16,3) can be implemented, for example, using 2.5 Gbps interconnections. As noted, the embodiment illustrated in FIG. 11 supports the switching of up to 256 inputs, shown as inputs 1120(1)–(256). Inputs 1120(1)–(256) are switched to one of outputs 1130(1)–(256).

Physically, each of the 48 switching nodes of this embodiment occupies a single slot in a matrix rack, such as that described below. The rack described below is arranged with three shelves (one per matrix column) that house the switch node cards (there are 16 such cards in every shelf) and six-shelf-processor cards (two per shelf).

Matrix Rack

A rack is used to hold one or more matrices, and is referred to herein as a matrix rack. In one embodiment, a matrix rack is configured to hold 48 switching nodes (i.e., switching nodes 1 100(1,1)–(16,3)) in a compact physical configuration. The matrix rack thus can support, for example, switching nodes 1100(1,1)–(16,3), which each provide 16 input signals and 16 output signals, and thus provides switching matrix 130 with 256 input signals and 256 output signals. Matrix shelf processors are configured in redundant pairs to provide fault-tolerant control of switch nodes 1100(1,1)–(16,3).

The cross-connect information, i.e., input-to-output mapping, is written into the crosspoint switch by a local microcontroller which receives the information from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is re-timed to synchronize the data with the system clock of router 100, using a clock and data recovery (CDR) unit, before being converted back into an optical signal that connects to the next stage of the matrix over fiber-optic cables.

Switch Node Module

Figure 12:
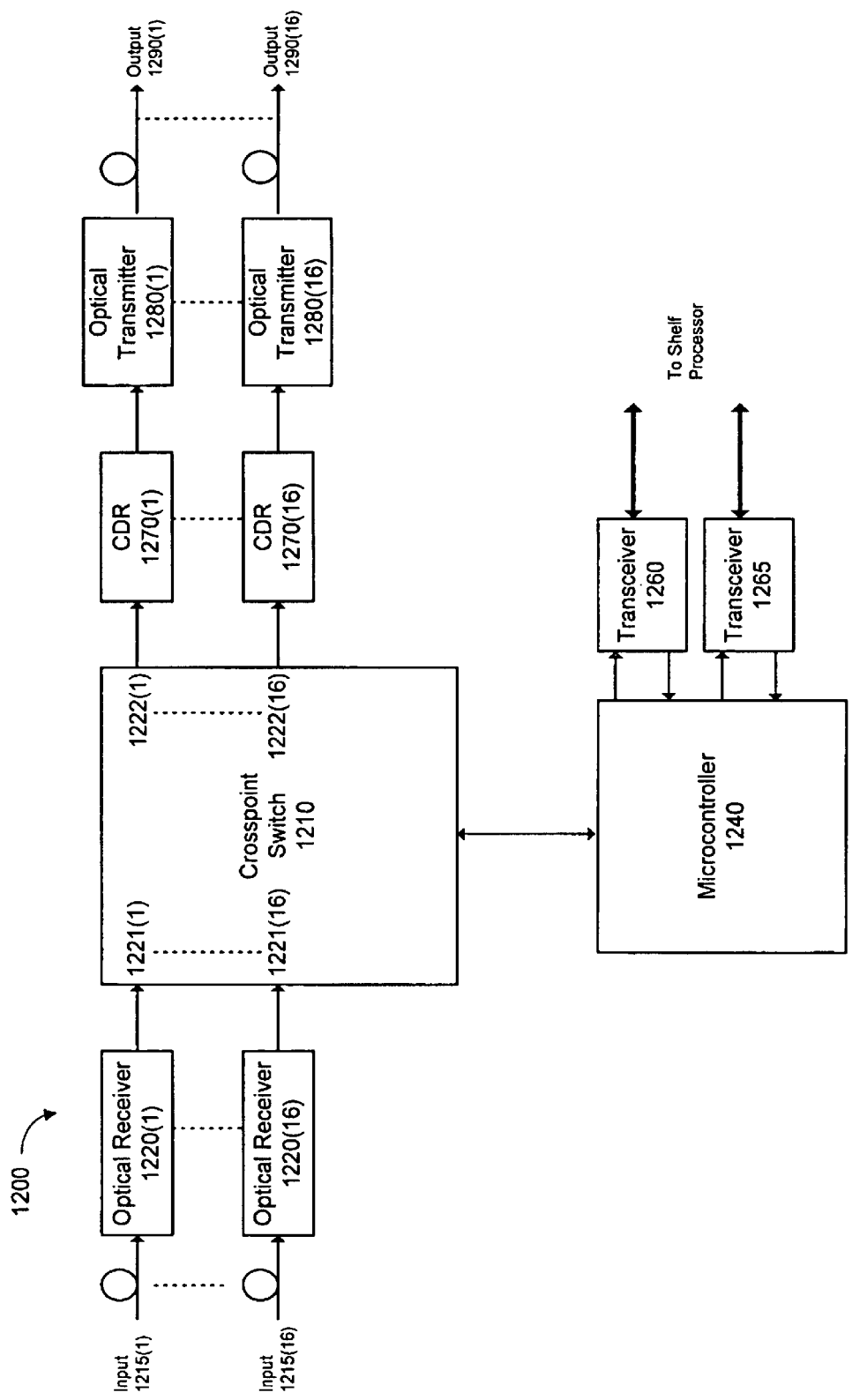
FIG. 12 illustrates a switching node.

FIG. 12 illustrates one of switching nodes 1100(1,1)–(16, 3) as a switching node 1200. Switching node 1200, in one embodiment, is a complete, strictly non-blocking, 16×16 OC-48 multi-stage crossbar matrix which allows any of its inputs to be connected to any of its outputs regardless of the current state of the matrix. A crosspoint switch 1210 is controlled by a local microcontroller (a microcontroller 1240) that also manages the optical transceivers, CDRs, and onboard SONET device. Configuration information is downloaded to switch node 1200 from microcontroller 1240 over a low-speed bus.

The block diagram of switch node 1200 in FIG. 12 illustrates the main elements of a switch node using a SONET-based implementation. The core of the switch node 1200 is crosspoint switch 1210, which is a 16×16 crossbar switch (when implementing a 256×256 matrix). Crosspoint switch 1210 is preferably a 2.5 Gbps 16×16 differential crosspoint switch with full broadcast capability. Any of its input signals can be connected to any, or all, of its output signals. The device is configured through a low-speed port that, through a two-step/two-stage process, allows changes to be made to switch configuration without disturbing its operation.

Assuming 16 input signals (indicated in FIG. 12 as inputs 1215(1)–(16)), crosspoint switch 1210 is configured to receive optical input signals from optical receivers 1220(1)–(16) at switch input signals 1221(1)–(16). Crosspoint switch 1210 also provides switch outputs 1222(1)–(16) which serve as the source of output signals for switch node 1200. Microcontroller 1240 communicates with the shelf processor via transceivers 1260 and 1265 over a bus that carries asynchronous data over the backplane (not shown). Incoming signals are routed to one of switch outputs 1222(1)–(16). Switch outputs 1222(1)–(16) are coupled to CDRs 1270(1)–(16), which in turn drive optical transmitters 1280(1)–(16). The outputs from optical transmitters 1280(1)–(16) appear at outputs 1290(1)–(16) as optical signals.

Figure 13:
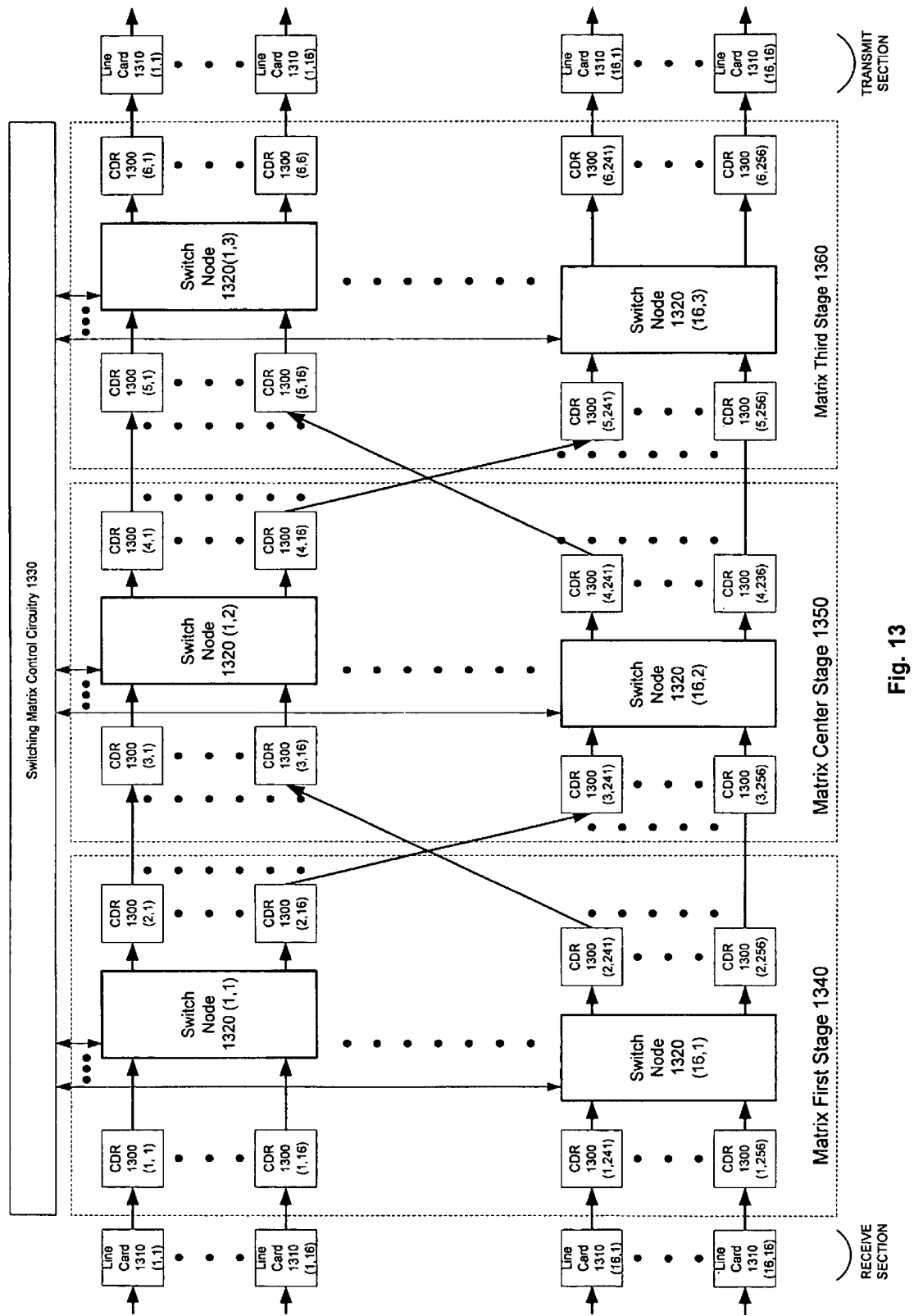
FIG. 13 illustrates a view of a switching matrix that includes clock/data recovery units and connections to the line cards.

FIG. 13 illustrates a simplified view of switching matrix 130, including connections to the line cards. The depiction of switching matrix 130 in FIG. 13 shows certain other details, such as clock/data recovery units (CDRs) 1300(1,1)–(6,256) and line cards 1310(1,1)–(16,16). A CDR recovers clock and data information from a serial bitstream by recovering the clocking signal from the incoming bitstream (e.g., using a phase-locked loop (PLL)), and then recovering the data using the clock thus recovered.

It will be noted that line cards 1310(1,1)–(16,16) correspond loosely to line cards 220(1,1)–(N,N), as depicted in FIG. 2. It will also be noted that line cards 1310(1,1)–(16,16) are each shown as being divided into a receive section and a transmit section as shown in FIG. 13, again in a fashion similar to that depicted in FIG. 2. Also depicted in FIG. 13 are switch nodes 1320(1,1)–(16,3) and a switching matrix control circuit 1330. Switch nodes 1320(1,1)–(16,3) correspond to switch nodes 1100(1,1)–(16,3) of FIG. 11, and may be implemented as shown in FIG. 12, for example. Switching matrix control circuitry 1330 includes elements such as microcontroller 1240 of FIG. 12 and matrix shelf processor 1000 of FIG. 10. More generically, the control function represented by switching matrix control circuitry 1330 is depicted in FIG. 3 as matrix shelf processors 370(1)–(N) and 371(1)–(N). As previously noted, switch nodes 1320(1,1)–(16,3) and their related CDRs are divided into three stages, which are depicted in FIG. 13 as matrix first stage 1340, matrix center stage 1350, and matrix third stage 1360. It will be noted that matrix first stage 1340, matrix center stage 1350, and matrix third stage 1360 correspond to the matrix stages represented by switch nodes 1100(1,1)–(16,1), switch nodes 1100(1,2)–(16,2), and switch nodes 1100(1,3)–(16,3). It will also be noted that the transmit side of line cards 1310(1,1)–(16,16) each include CDR functionality.

Figure 14:
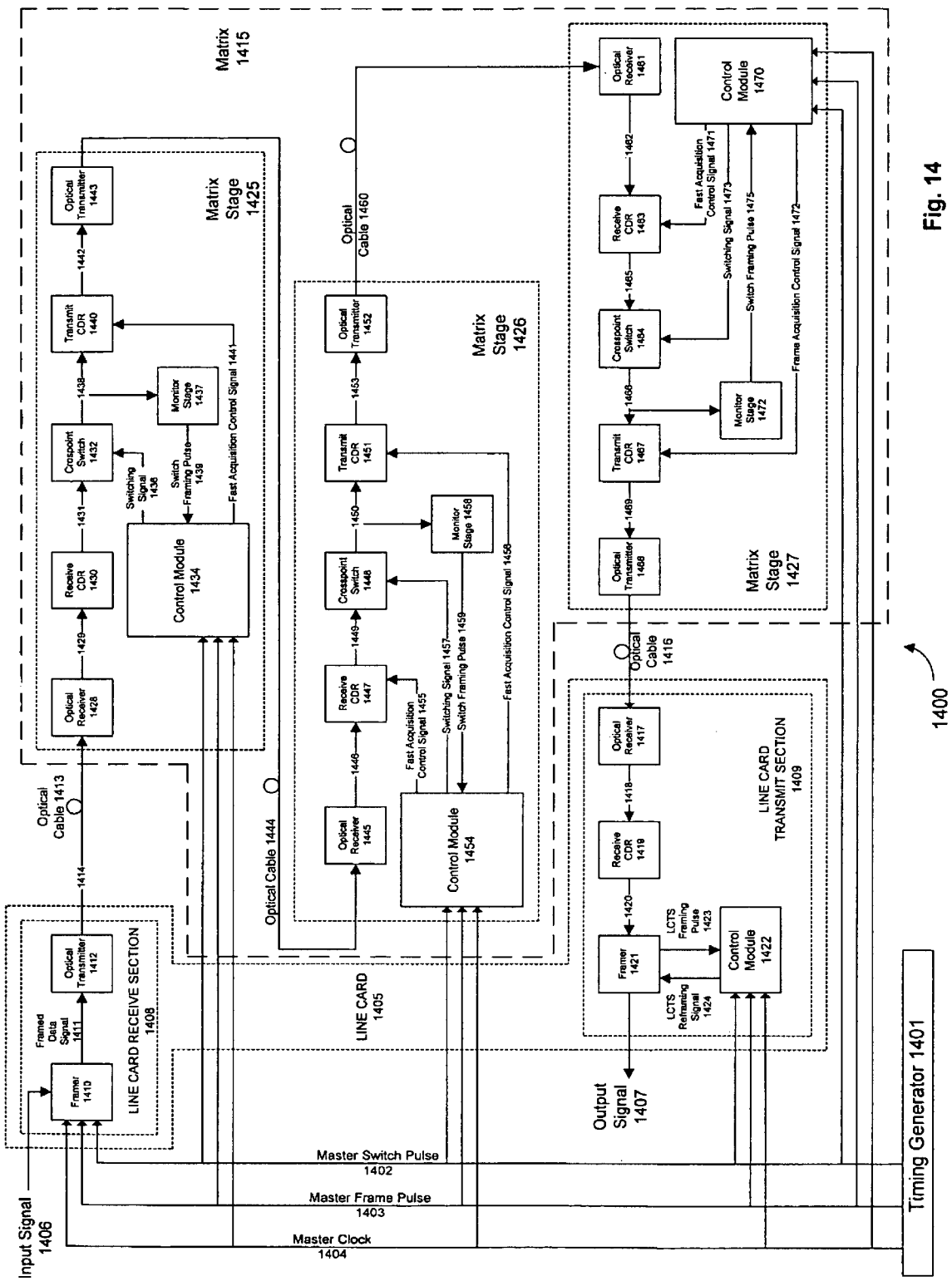
FIG. 14 illustrates one embodiment of an errorless rearrangement path.

FIG. 14 illustrates one embodiment of an errorless rearrangement path (ERP) 1400 according to the present invention. The following description is cast in terms of the signals being transferred. A timing generator 1401 is provided to generate global timing and control signals that are used by a number of the subsystems in router 100. Normally, only a single such timing generator is employed, although a back-up timing generator may be desirable. Timing generator 1401 generates, among other signals, a master switch pulse 1402, a master frame pulse 1403, and a master clock 1404. Master switch pulse 1402 provides an indication to all subsystems of router 100 that a switch of matrix 130 is being executed, and in particular, that all crosspoint switches should reconfigure themselves per the configuration pre-loaded into them. Master frame pulse 1403 is used by framers and other subsystems to generate proper framing of the received signal. Master clock 1404 is the standard clock distributed the various subsystems of router 100. The major components of interest and their various subsystems are now described.

A line card 1405 is shown as receiving an input signal 1406 and transmitting an output signal 1407. In accordance with the depiction of signal paths 200 in FIG. 2, line card 1405 is divided into a line card receive section (LCRS) 1408 and a line card transmit section (LCTS) 1409. This is reflected in FIGS. 2 and 13 by the notations regarding the line cards having receive and transmittal sides. Line card receive section 1408 receives input signal 1406 at a framer 1410. Framer 1410 generates a framed data signal 1411 using master frame pulse 1403 to generate proper framing of input signal 1406. Framer 1410 includes a programmable delay counter (not shown) that allows the output framing location to be relocated relative to master frame pulse 1403. This allows the framing of input signal 1406 to account for the differing delays that may be caused by differences in cable length.

Framed data signal 1411 is then provided to optical transmitter 1412 for transmission across an optical cable 1413 (as an optical signal 1414) to matrix 1415. Line card transmit section 1409 receives an optical signal over an optical cable 1416 at an optical receiver 1417. Optical receiver 1417 converts the optical signal into an electrical signal (a signal 1418), which is in turn provided to a receive CDR 1419. Receive CDR 1419 recovers the clock and data from signal 1418, providing the resulting signal (a signal 1420) to a framer 1421.

Framer 1421, under the control of a line card transmit section (LCTS) control module 1422, generates output signal 1407 with the proper framing. In order to properly frame the data in signal 1420, LCTS control module 1422 receives master switch pulse 1402, master frame pulse 1403, and master clock 1404 from timing generator 1401, and LCTS framing pulse 1423 from framer 1421. LCTS control module 1422 uses these signals to generate an LCTS reframing signal 1424, which is provided to framer 1421. LCTS reframing signal 1424 is used to control the fast reframing of framer 1421 upon the switching of matrix 1415.

Matrix 1415 includes a matrix stage 1425, a matrix stage 1426, and a matrix stage 1427. Matrix stage 1425 receives the optical signal from line card receive section 1408 (an optical signal 1414) at an optical receiver 1428, which converts optical signal 1414 into an electrical signal (a signal 1429). Clock and data information are recovered from signal 1429 by a receive CDR 1430. Receive CDR 1430 passes the recovered signal (a signal 1431) to a crosspoint switch 1432. Crosspoint switch 1432 is controlled by a control module 1434 via a switching signal 1436. It will be noted that crosspoint switch 1432 is comparable to crosspoint switch 1210 of FIG. 12 and that optical receiver 1428 is comparable to one of optical receivers 1220(1)–(16). Similarities between other elements of matrix stage 1425 and switch node 1200 will also be noted. These similarities also hold true for matrix stages 1426 and 1427, as well.

Control module 1434 monitors the output of crosspoint switch 1432 by the use of a monitor stage 1437, which frames to the output of crosspoint switch 1432 (a signal 1438) and generates a switch framing pulse 1439. Signal 1438 is provided to a transmit CDR 1440 for clock recovery and recovery of the data signal under the control of a fast acquisition control signal 1441 that is generated by control module 1434. Transmit CDR 1440 recovers clock and data information from signal 1438 to recover a signal 1442, which is then provided to an optical transmitter 1443. Optical transmitter 1443 converts signal 1442 from an electrical signal into an optical signal that is transmitted from matrix stage 1425 to matrix stage 1426 over an optical cable 1444.

Optical receiver 1445 of matrix stage 1426 receives the optical signal provided via optical cable 1444 and converts the optical signal into an electrical signal (a signal 1446) that is, in turn, provided to a receive CDR 1447. Receive CDR 1447 recovers clock and data information from signal 1446 and provides this data to crosspoint switch 1448 as a signal 1449. Crosspoint switch 1448 switches signal 1449 to an output that appears at an output of crosspoint switch 1448 as signal 1450, which is in turn provided to transmit CDR 1451. Transmit CDR 1451 recovers clock and data information, once again, and provides this data to an optical transmitter 1452 as a signal 1453.

A control module 1454 controls the switching of crosspoint switch 1448 and the relocking of receive CDR 1447 and transmit CDR 1451. Control module 1454 provides fast acquisition control signals 1455 and 1456 to receive CDR 1447 and transmit CDR 1451, respectively. Control module 1454 causes crosspoint switch 1448 to switch using a switching signal 1457. A monitor stage 1458 receives signal 1450 from crosspoint switch 1448 and frames to signal 1450 in order to generate a switch framing pulse 1459, which is then provided to control module 1454. Control module 1454 generates the fast acquisition and switching signals using switch framing pulse 1459 in combination with master switch pulse 1402, master frame pulse 1403, and master clock 1404. Optical transmitter 1452 converts signal 1453 into an optical signal that is provided to matrix stage 1426 via an optical cable 1460.

The configuration of matrix 1427 is substantially similar to that of matrix stage 1426. Matrix stage 1427 receives the optical signal transmitted by optical transmitter 1452 over optical cable 1460 at an optical receiver 1461 and converts the optical signal into an electrical signal (a signal 1462). Signal 1462 is in turn provided to a receive CDR 1463, which recovers clock and data information from signal 1462, and provides the recovered data information to crosspoint switch 1464 as a signal 1465. Crosspoint switch 1464 switches signal 1465 to an output that appears at an output of crosspoint switch 1464 as signal 1466, which is in turn provided to transmit CDR 1467. Transmit CDR 1467 recovers clock and data information, once again, and provides the recovered data information to an optical transmitter 1468 as a signal 1469.

Controlling the switching of crosspoint switch 1464 and the relocking of receive CDR 1463 and transmit CDR 1467 is a control module 1470. Control module 1470 provides fast acquisition control signals 1471 and 1472 to receive CDR 1463 and transmit CDR 1467, respectively. Control module 1470 controls the switching of crosspoint switch 1464 using a switching signal 1473. A monitor stage 1474 receives signal 1466 from crosspoint switch 1464 and frames to signal 1466 in order to generate a switch framing pulse 1475, which is then provided to control module 1470. Control module 1470 generates the fast acquisition and switching signals using switch framing pulse 1475 in combination with master switch pulse 1402, master frame pulse 1403, and master clock 1404. Optical transmitter 1468 converts signal 1469 into an optical signal (an optical signal 1476) that is provided to LCTS 1409 via optical cable 1416 for transmission as output signal 1407. The operations performed by LCTS 1409 in generating output signal 1407 have been explained previously.

Certain of these signals and their relationships are now described further detail. The signals from timing generator 1401 include:

1. Master switch pulse 1402: The master signal indicating that switching (an errorless switch) should be initiated (sent to all modules).
2. Master frame pulse 1403: The master frame pulse signal sent to all modules to allow the modules to recognize framing.
3. Master clock 1404: The master clock signal distributed to all modules. In a system configured to support OC-48 optical signals (2.488 Gbps), this is a 155.52 MHz clock.

As also shown in FIG. 14, the signals within matrix stage 1425 include:

1. Signal 1429, which is the framed data output from optical receiver 1428 corresponding to optical signal 1414 and the input to receive CDR 1430.
2. Signal 1431, which is the framed data output recovered by receive CDR 1430 and input to crosspoint switch 1432.
3. Signal 1438, which is the framed data output switched by crosspoint switch 1432, and input to transmit CDR 1440 and monitor stage 1437.
4. Signal 1442, which is the framed data output recovered by transmit CDR 1440 and input to optical transmitter 1443.
5. Switch framing pulse 1439, which is the signal indicating the start of frame location in signal 1438.
6. Switching signal 1436, which is the signal that provides the switch pulse causing crosspoint switch 1432 to assume a new switch configuration.
7. Fast acquisition control signal 1441, which is the signal generated by control module 1434 that causes transmit CDR 1440 to perform a fast lock action on signal 1438.

FIG. 14 depicts matrix stage 1426 as including the following signals:

1. Signal 1446, which is the framed data output from optical receiver 1445 corresponding to the optical signal transmitted by optical transmitter 1443 and input to receive CDR 1447.
2. Signal 1449, which is the framed data output recovered by receive CDR 1447 and input to crosspoint switch 1448.
3. Signal 1450, which is the framed data output switched by crosspoint switch 1448, and input to transmit CDR 1451 and monitor stage 1458.
4. Signal 1453, which is the framed data output recovered by transmit CDR 1451 and input to optical transmitter 1452.
5. Switch Framing Pulse 1459, which is the signal indicating the start of frame location in signal 1450.
6. Switching signal 1457, which is the signal that provides the switch pulse causing crosspoint switch 1448 to assume a new switch configuration.
7. Fast acquisition control signals 1455 and 1456, which are the signals generated by control module 1454 that causes receive CDR 1447 and transmit CDR 1451 to perform a fast lock action on signals 1446 and 1450, respectively.

Signals within matrix stage 1427 include:

1. Signal 1462, which is the framed data output from optical receiver 1461 and the input to receive CDR 1463.
2. Signal 1465, which is the framed data output recovered by receive CDR 1463 and input to crosspoint switch 1464.
3. Signal 1466, which is the framed data output switched by crosspoint switch 1464, and input to transmit CDR 1467 and monitor stage 1472.
4. Signal 1469, which is the framed data output recovered by transmit CDR 1467 and input to optical transmitter 1468.
5. Switch Framing Pulse 1475, which is the signal indicating the start of frame location in signal 1466.
6. Switching signal 1473, which is the signal that provides the switch pulse causing crosspoint switch 1464 to assume a new switch configuration.
7. Fast acquisition control signals 1471 and 1472, which are the signals generated by control module 1470 that causes receive CDR 1463 and transmit CDR 1467 to perform a fast lock action on signals 1462 and 1466, respectively.

Signals within LCTS 1409 include:

1. Signal 1418, which is the framed data output from optical receiver 1417 and the input to receive CDR 1419.
2. Signal 1420, which is the framed data output recovered by receive CDR 1419 and input to framer 1421.
3. LCTS framing pulse 1423, which is the frame pulse indicating the start of frame location in signal 1420.
4. LCTS reframing signal 1424, which is the reframe signal from control module 1422 that causes framer 1421 to freeze its clock input (on the falling edge of LCTS reframing signal 1424) and then to restart clock and find framing pattern (on the rising edge of reframing signal 1424).

Not shown in the block diagram is a common communications connection to all blocks that is used for initialization and status monitoring.

For purposes of this discussion, it is assumed that the data delay through all optical modules, CDRs and switches is negligible. However, cabling is expected to introduce substantial delays into the data signal. The measurement and management of cable-related data delays is therefore an important issue. This issue can arise, for example, in the following manner. Normally, multiple LCRSs are connected to matrix stage 1425 (these LCRSs are merely represented by LCRS 1408), and so the lengths of the cables connecting each of the LCRS modules to matrix stage 1425 may be of differing lengths. Such differences in length can cause substantial variations in the delay experienced by the signals carried by these cables. Such delays should therefore be compensated for, and, given their variation, compensated for independently (e.g., via a delay register in the signal's respective framer (e.g., framer 1410)).

In this regard, it will be noted that multiple copies of the single data path shown exist for each of matrix stages 1425, 1426, and 1427, as do multiple copies of the optical cable connecting matrix stages 1425 and 1426 (e.g., optical cable 1444). All such cables are preferably of matched length. Multiple copies of the cable connecting matrix stage 1426 and 1427 (e.g., optical cable 1460) are used, with all such cables preferably of matched length. However, in a fashion similar in regard to the LCRS modules, multiple LCTS modules are normally connected to matrix stage 1427 via optical cabling (e.g., optical cable 1416). These cables may also be of differing lengths. As before, such variation in delay should be accounted for. Preferably, the LCTS modules are designed to accommodate such variation.

Prior to being transferred through router 100, one embodiment of the present invention rearranges the information present in the incoming data to maximize the amount of time available for relocking. As noted, a certain amount of time is required for the various subsystems in router 100 to reacquire clock information and phase lock onto the incoming data stream. Because switching is performed during a relocking period, the longer the relocking period can be made, the less onerous the burden on the system's design (in terms of the speed with which relocking must be accomplished in order to avoid errors in the live data passing through router 100). By rearranging the incoming data, unused bit times throughout a frame may be made contiguous, thereby increasing the amount of time available for relocking. One scheme for rearranging the data in an incoming SONET frame is now described.

FIG. 15 illustrates a standard frame of the synchronous optical network (SONET) protocol, exemplified here by a SONET frame 1500. SONET frame 1500 is divided horizontally into ninety columns and is divided vertically into nine rows. The first three columns of SONET frame 1500 contain overhead bytes used for framing, communications, and other purposes. The remaining 87 columns contain data and are collectively referred to as payload. The overhead bytes include an A1 byte 1502, an A2 byte 1504, a J0/Z0 byte 1506, a B1 byte 1510, an E1 byte 1512, an F1 byte 1514, a D1 byte 1520, a D2 byte 1522, a D3 byte 1524, an H1 byte 1530, an H2 byte 1532, an H3 byte 1534, an H4 byte 1536, a B2 byte 1540, a K1 byte 1542, a K2 byte 1544, a D4 byte 1550, a D5 byte 1551, a D6 byte 1552, a D7 byte 1553, a D8 byte 1554, a D9 byte 1555, a D10 byte 1556, a D11 byte 1557, a D12 byte 1558, an S1/Z1 byte 1570, an M1/Z2 byte 1572, and an E2 byte 1574. Also included in SONET frame 1500 is payload data, represented here by payload bytes 1590–1598. It will be noted that each of payload bytes 1590–1598 includes 87*48 bytes of data for an OC-48 SONET frame (except payload bytes 1593, which includes 86*48 bytes of data (due to the existence of H4 byte 1536)).

In certain embodiments of the present invention, these overhead bytes and payload are rearranged in order to support errorless switching in switching matrix 130. In one embodiment, the overhead bytes are moved to the beginning of the frame used to transport data through a system such as router 100. By moving the overhead bytes to the beginning of the frame, the byte times are concatenated in order to support the relock of the CDRs within router 100 by increasing the time available for relock.

It will be noted that certain of the overhead bytes in FIG. 15 are marked with the letter U. This indicates the bytes so marked are stripped off by protocol processor 420 and are thus unused in the switching of the data streams represented by SONET frame 1500 while the data is within router 100. These bytes are preferably the bytes "rearranged" to form an extended period of time during which relocking can occur. In fact, because these bytes are stripped off, other bytes are simply moved into their position, overwriting the stripped-off bytes and making room at the beginning of the frame for the relocking operation. One example of such a rearranged frame, referred to herein as an errorless switching frame (ESF), is given below.

Figure 16:
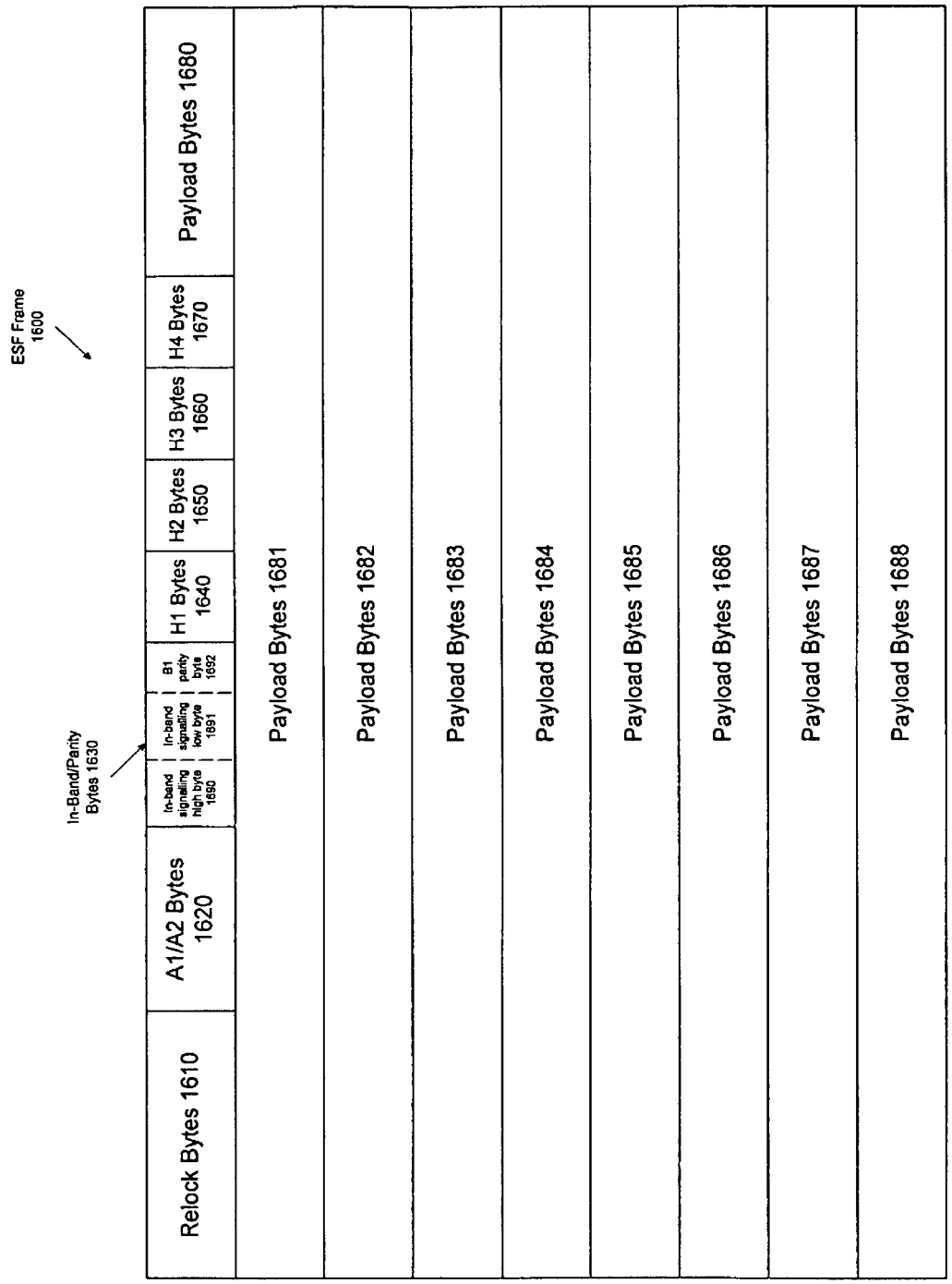
FIG. 16 illustrates one embodiment of an errorless switching frame.

FIG. 16 illustrates one embodiment of an ESF 1600, generated by rearranging a SONET frame received by router 100. ESF 1600 includes relock bytes 1610, A1/A2 bytes 1620 (corresponding to A1 byte 1502 and A2 byte 1504 of SONET frame 1500), in-band/parity bytes 1630, H1 bytes 1640 (corresponding to H1 byte 1530 of SONET frame 1500), H2 bytes 1650 (corresponding to H2 byte 1532 of SONET frame 1500), H3 bytes 1660 (corresponding to H3 byte 1534 of SONET frame 1500), H4 bytes 1670 (corresponding to H4 byte 1536 of SONET frame 1500), and payload bytes 1680–1688 (corresponding to payload bytes 1590–1598 of SONET frame 1500). In protocol processor 420 (of FIG. 4), the overhead bytes of SONET frame 1500 marked as unused ("U") are "moved" to the position of relock bytes 1610 (as well as A1/A2 bytes 1620 and in-band/parity bytes 1630) by moving payload or control information into the unused bytes. In effect, the overhead bytes of SONET frame 1500 marked as unused can simply be overwritten when rearranging the frame. The data is preferably rearranged such that a relatively large number of bytes at the beginning of the frame are made available for use in performing the errorless switching operation, and most preferably, that a maximum number of bytes at the beginning of the frame are made available for such purposes.

Relock bytes 1610 are inserted in place of these first bytes. Relock bytes 1610 preferably consist of data that will create signals rich in transitions. This eases the CDRs' task of re-acquiring phase lock, because each transition is an opportunity for the CDRs' to begin the process of re-acquiring clocking information. One example of a bit pattern rich in transitions is a binary representation of the hexadecimal number "55", which produces a string of alternating 1's and 0's (with a transition between each bit time).

A1/A2 bytes 1620 represent A1 byte 1502 and A2 byte 1504 from 48 STS-1 channels in an OC-48 signal. A1/A2 bytes 1620 may include, for example, 24 bytes of the A1 framing byte and 24 bytes of the A2 framing byte. In-band bytes 1630 may be divided into an in-band signaling high byte 1690, an in-band signaling low byte 1691, and a B1 parity byte 1692. The next four portions of ESF 1600 are pointer and payload bytes from the 48 STS-1 channels supported by the OC-48 SONET frame. H1 bytes 1640 include the H1 pointer bytes from each of the 48 STS-1 channels. In similar fashion, H2 bytes 1650 contain the H2 pointer bytes from those STS-1 channels, H3 bytes 1660 contain the H3 stuff bytes from the 48 STS-1 channels, and H4 bytes 1670 contain the 48 H4 stuff bytes from the 48 STS-1 channels. Payload bytes 1680–1688 contain their respective portions of the payload bytes of the 48 STS-1 channels supported by the OC-48 stream.

In one embodiment, in-band/parity bytes 1630 are actually a 48-byte column in which three of the bytes are used for in-band signaling high byte 1690, in-band signaling low byte 1691, and B1 parity byte 1692, with the remaining 45 bytes being reserved. While the H1, H2, and H3 bytes of each of the STS-1 channels of the OC-48 stream are defined, in some embodiments, the H4 byte of each channel can be considered to be part of the SONET payload. The various fields in row 1 of ESF 1600 are shown in Table 2.

TABLE 2

Detail of an exemplary layout of errorless switching frame 1600.

| Row 1 Byte Numbers | # of Bytes | Overhead Byte Name | Notes |
| --- | --- | --- | --- |
| 1–1056 | 1056 | 1056 - RLK bytes | Used to relock CDRs. Relocking pattern is preferably transition (edge) rich (e.g., a pattern of 0x55) |
| 1057–1080 | 24 | 24 - A1 bytes | Framing Byte. A1 pattern = 0xF6 |
| 1081–1104 | 24 | 24 - A2 bytes | Framing Byte. A2 pattern = 0x28 |
| 1105 | 1 | 1 - IBH byte | Inband Signaling High-byte |
| 1106 | 1 | 1 - IBL byte | Inband Signaling Low-byte |
| 1107 | 1 | 1 - byte B1 | B1 Parity Byte |
| 1108–1152 | 45 | 45 - Reserved bytes | Fixed pattern = 0x00. Reserved. |
| 1153–1200 | 48 | 48 - H1 bytes | Pointer Byte. H1 = H1 pointer byte |
| 1201–1248 | 48 | 48 - H2 bytes | Pointer Byte. H2 = H2 pointer byte |
| 1249–1296 | 48 | 48 - H3 bytes | Pointer Byte. H3 = H3 pointer action stuff byte |
| 1297–1344 | 48 | 48 - H4 bytes | Payload Byte. H4 = stuff byte position |
| 1345–4320 | 2976 | 2976 - payload bytes | Payload Bytes |

As noted, relock bytes 1610 preferably contained a pattern of 1's and 0's (e.g., a hexadecimal value of "55"). This pattern is used to help the CDRs along the signal path within router 100 to re-acquire phase lock quickly during the rearrangement of switching matrix 130 by providing a signal rich in edges (i.e., transitions) on which the PLLs of the CDRs can acquire lock. A1/A2 bytes 1620 are framing bytes that preferably use a standard SONET format of F6 and 28, respectively. A full column of A1 and A2 bytes are preferably used to form A1/A2 1620. As noted, in-band signaling high byte 1690 and in-band signaling low byte 1691 are provided to support in-band signaling, and so allow communication on an in-band basis over a network such as network 190. As will be apparent to one of skill in the art, the above format is merely exemplary. The information illustrated above may be organized in an alternate format, and various pieces of information omitted from ESF frame 1600, or included in ESF frame 1600 from SONET frame 1500.

To help ensure the accurate transmission of data, B1 parity byte 1692 is provided to allow parity checking through a system such as router 100. B1 parity byte 1692 is preferably calculated using the standard SONET definition, and is preferably calculated across all bytes in ESF 1600, save for relock bytes 1610, and A1/A2 bytes 1620. Relock bytes 1610 and A1/A2 bytes 1620 are excluded from this calculation to avoid the detection of false parity errors during the rearrangement of switching matrix 130. At such a time, the system will not be able to capture relock byte 1610 and A1/A2 byte 1620. As noted, the undefined bytes following in-band/parity bytes 1630 are reserved and so are preferably set to a hex value of 0x00. In-band/parity bytes 1630 and the undefined bytes which follow thus define a 48-byte column.

H1 bytes 1640, H2 byte 1650, and H3 bytes 1660 are pointer bytes into the payload of the original SONET frame. In one embodiment, there are 48 copies of each of these bytes in order to support the 48 STS-1 channels in an OC-48 stream. Preferably, the values carried in H1 byte 1640 and H2 byte 1650 are modified from the standard SONET definition to allow for the different locations of various payload bytes in ESF 1600. In a similar fashion, there are 48 copies of each STS-1 channel's H4 byte that make up H4 bytes 1670, and it is the H4 byte that is used as a stuff position during pointer justifications (although the H4 byte may be considered as a part of the payload). Preferably, scrambling is used on data sent over the signal paths of router 100. More preferably, all bytes in ESF 1600 are scrambled with the exception of relock bytes 1610 and A1/A2 bytes 1620. While any acceptable method may be used for this scrambling, a standard SONET scrambling polynomial is preferably used for the scrambling pattern.

While it may be preferable to rearrange incoming data streams to allow for errorless switching, depending on the amount of time required for various elements of router 100 to reacquire lock, such rearrangement of the incoming data stream is not strictly necessary. In fact, if switching and resynchronization can be performed quickly enough, no rearrangement whatever need be performed. This may depend not only on the speed with which the hardware is capable of re-acquiring lock, but on the amount of contiguous unused data at the beginning of a frame available for use in the switching operation, due either to the underlying protocol employed or the transmission of a special frame that allows for such switching. Thus, given a sufficient period of time (a sufficient number of unused bit times) at the beginning of a frame, no arrangement may be needed to perform errorless switching according to embodiments of the present invention.

Alternatively, the signal paths of a system such as router 100 may be operated at a speed higher than that of the incoming data stream. In such a case, more byte positions will exist per unit time than exist bytes from the incoming data stream. In such a scenario, a number of system-defined bytes would be inserted before the bytes from the incoming data stream are received. Among other possible uses of these system-defined bytes would be the possibility of provided relocking bytes (e.g., relock bytes 1610) which could be corrupted (as they might be during the switching of a switching matrix such as switching matrix 130) without deleterious effects on the "live" data channels carried over the incoming data stream. These relocking bytes would also serve to support fast re-acquisition of lock by the CDRs within the system.

Figure 17:
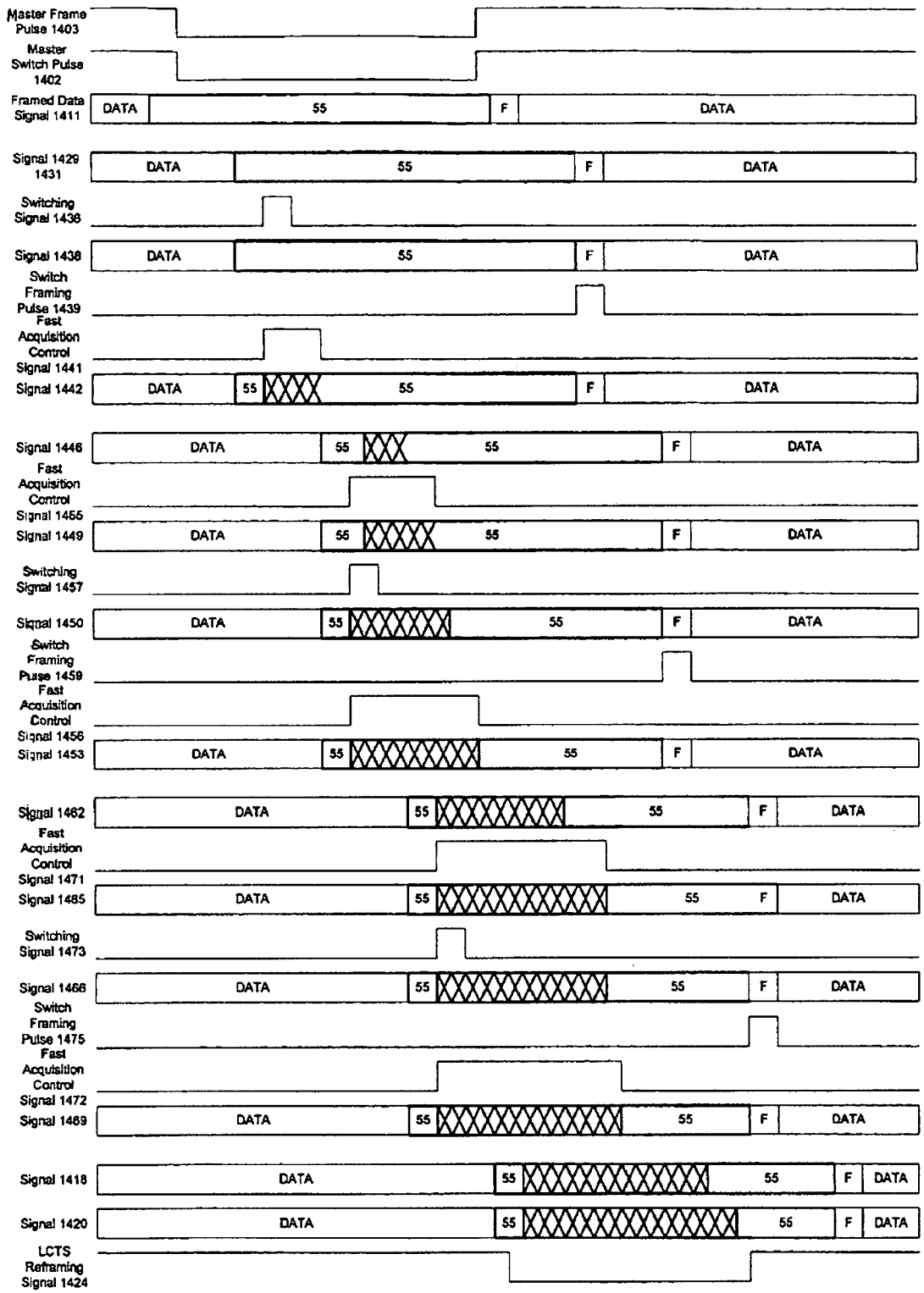
FIG. 17 illustrates the various control and data signals of the errorless rearrangement path of FIG. 14.

FIG. 17 illustrates the various control and data signals of FIG. 14. The data signals shown on all lines show several elements of the data signals. The portion of the signal marked "DATA" is valid transported data that must not be disturbed by the errorless rearrangement operation. The portion of the signal marked "55" is a relocking pattern of zeroes and ones of fixed duration in the frame and is used to assist in the fast relocking of the various CDRs throughout the datapath of router 100. The portion marked "F" indicates the start of frame mark for the data frame. The portion of the relocking signal marked "XXX" indicates that period of time when the CDRs are not locked to the incoming serial data frame.

In one embodiment, the relocking pattern in the frame is a fixed duration of 8448 bit times. The entire errorless rearrangement function must be accomplished in the 8448 bit times of the relocking pattern to avoid any loss of data. The signals are grouped into the five major blocks that make up the errorless rearrangement path (line card receive sections (LCRS 1408), the three matrix stages (matrix stages 1425, 1426, and 1427), and line card transmit sections (LCTS 1409)). The data delay introduced by the cabling is shown in the data path signals shown in the diagram, and appears as the skewing of the data/relocking pattern.

The fast acquisition control signals within each matrix stage are asserted into their respective CDRs prior to the given CDR's inputs becoming unknown are held for a period of time necessary for the CDR to perform a fast relock function. The fast acquisition control signals should be sequenced carefully to track the location of the "55" portion of the data frame and the state of the signal coming into each respective CDR.

Figure 18:
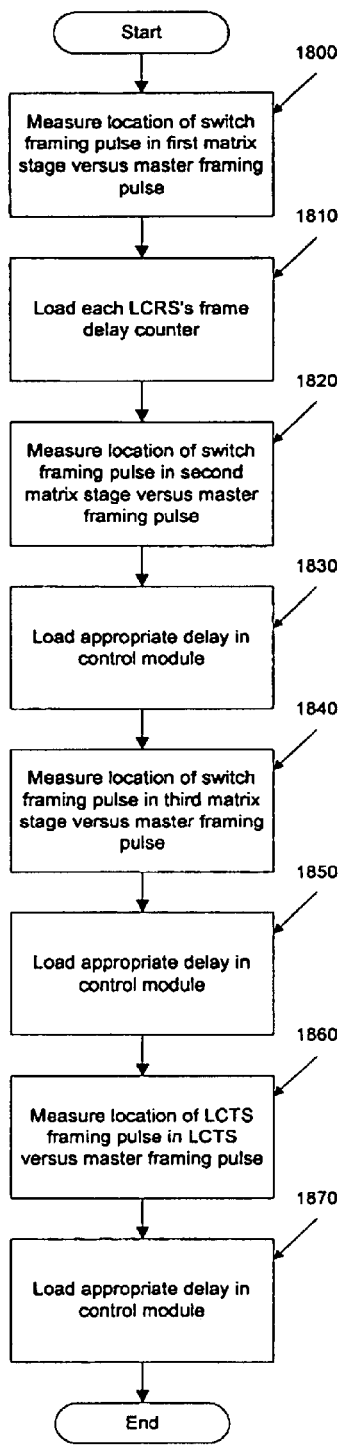
FIG. 18 illustrates the operations performed in the initialization of the errorless rearrangement path of FIG. 14.
Figure 19:
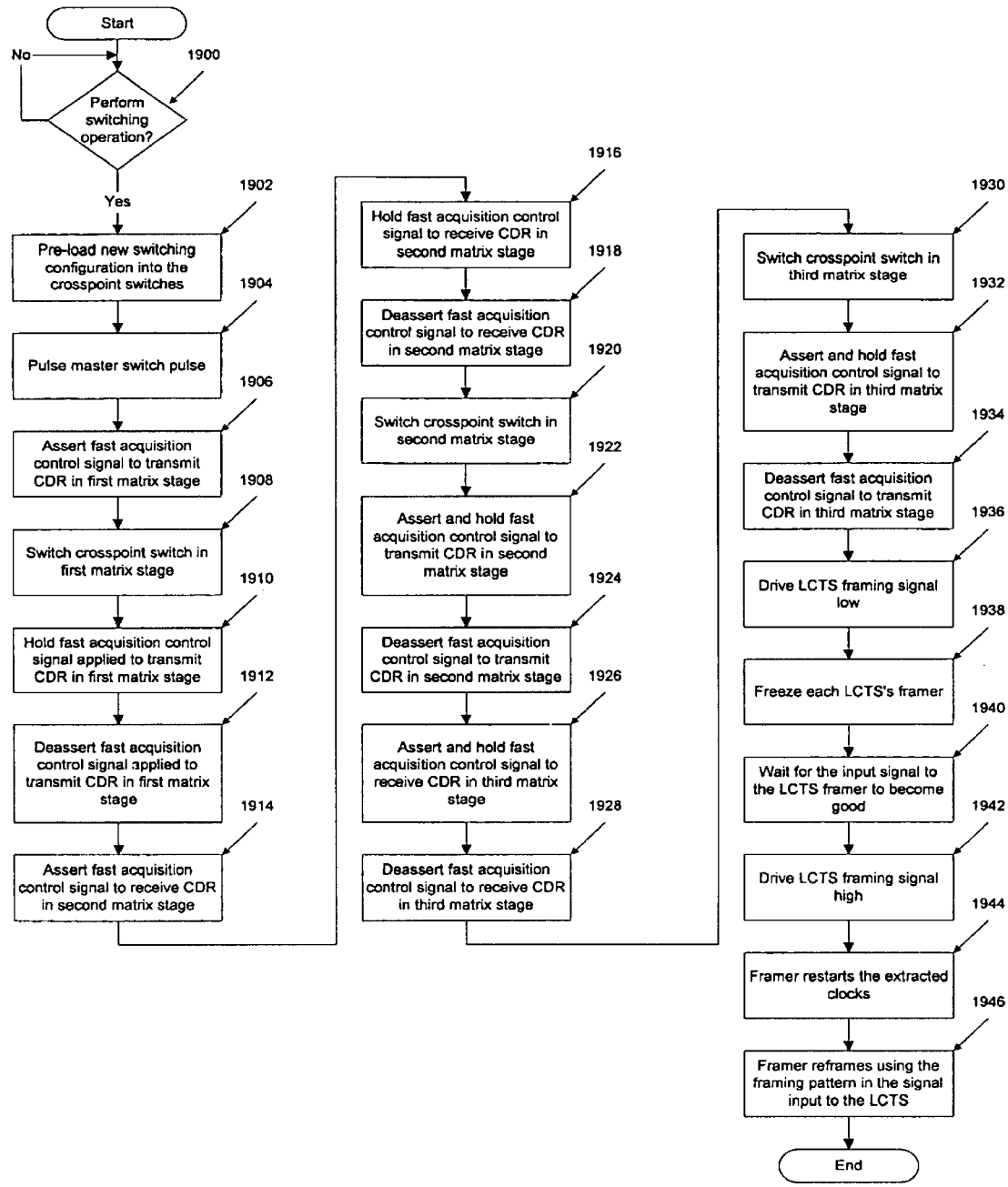
FIG. 19 illustrates the actions taken in performing an errorless switching operation.

FIGS. 18 and 19 are flow diagrams illustrating the events represented by the transitions depicted in FIG. 17 that are experienced by the aforementioned signals when performing errorless switching operations within a router such as router 100. It will be noted that the events depicted in FIGS. 18 and 19 are described in terms of the signal transitions of FIG. 17. These and other such operations are now described.

FIG. 18 illustrates the operations performed in system initialization. These operations, which are not illustrated in FIG. 17 (as they are not part of the actual switching process illustrated thereby), proceed as follows:

1. The location of switch framing pulse 1439 is measured relative to the master frame pulse (master frame pulse 1403) (step 1800). The location of switch framing pulse 1439 is specified in number of clock pulses. Switch framing pulse 1439 should be measured separately for each of the LCRSs in the system. The distance of switch framing pulse 1439 (in clock pulses) from master frame pulse 1403 signal is used to determine the length of each cable from an LCS (e.g., optical cable 1413) to the first stage of the matrix.
2. The lengths of these cables, as determined by the measurements made in the preceding step, are compensated for by a frame delay counter in each framer of each LCRS (e.g., framer 1410) (step 1810). The delay counter is programmed such that all data arriving at matrix stage 1425 (via signal 1429) is synchronized such that all inputs to matrix stage 1425 arrive substantially simultaneously.
3. The location of switch framing pulse 1459 is then measured relative to master frame pulse 1403 (step 1820). The location of the pulse on switch framing pulse 1459 is ascertained and stored in control module 1454 (step 1830). The location of switch framing pulse 1459 relative to master frame pulse 1403 is determined so that fast acquisition control signal 1455, switching signal 1457 and fast acquisition control signal 1456 can begin at the correct location in the frame when a "switch" operation is indicated by master switch pulse 1402. Fast acquisition control signal 1455, switching signal 1457 and fast acquisition control signal 1456 must rise at the beginning of the relocking pattern being present in signal 1446 and signal 1450.
4. The location of switch framing pulse 1475 is measured relative to master frame pulse 1403 (step 1840). The location of the pulse on switching framing pulse 1475 is ascertained and stored in control module 1470 (step 1850). The location of switching framing pulse 1475 relative to master frame pulse 1403 is needed such that fast acquisition control signals 1471 and 1472, and switching signal 1473 can begin at the correct location in the frame when a "switch" operation is indicated by master switch pulse 1402. Fast acquisition control signals 1471 and 1472, and switching signal 1473 must rise at the beginning of the relocking pattern being present signal 1462 and signal 1466.
5. The location of LCTS framing pulse 1423 is measured relative to master frame pulse 1403 (step 1860). The location of the pulse on LCTS framing pulse 1423 (as specified in number of clock counts from master frame pulse 1403) is stored in control module 1422 as a delay count (step 1870). The delay count is used to offset master frame pulse 1403 such that the master frame pulse 1403 can be used as the LCTS reframing signal 1424, and is synchronized correctly with the relocking pattern in the frame as seen in signal 1418 and signal 1420.

FIG. 19 illustrates the actions taken after initialization, in performing a switching operation. The actions discussed with regard to FIG. 19 are illustrated by the waveforms depicted in FIG. 17, unless otherwise noted in the description of the given action. Once the system is initialized, switching of the incoming signals may then be performed, as desired. It will be noted that an exemplary value of 200 bit times is used in determining the time required for lock hold/acquisition times. This value is merely used to facilitate explanation of the operation of router 100, and could be any value acceptable for the given framing/synchronization technology employed. This value would, in fact, be expected to drop with the advent of higher-speed technologies in the future. The errorless rearrangement sequence is performed as. follows:

1. The process begins when a global processing element (not shown) determines that an errorless switch rearrangement operation is required (step 1900) (not shown in FIG. 17).
2. The new switch configuration is preloaded into each of the three switch elements (crosspoint switches 1432, 1448 and 1464) (step 1902) (not shown in FIG. 17). The new switch configuration information is stored in crosspoint switches 1432, 1448, and 1464, but is not actually applied to the switches until the crosspoint switches are instructed to do so by master switch pulse 1402. The loading of the new configuration information is therefore not time critical.
3. The global processing element issues a pulse on master switch pulse 1402 (step 1904). In one embodiment, master switch pulse 1402 need only be pulsed once to perform the entire errorless rearrangement operation.
4. Fast acquisition control signal 1441 is asserted to indicate to transmit CDR 1440 that a phase change will occur on its input data signal (signal 1438) (step 1906). Fast acquisition control signal 1441 is asserted at the point at which the relocking pattern becomes present on signal 1438, as determined by the location of the framing pulse on switch framing pulse 1439.
5. A pulse on switching signal 1436 is applied to crosspoint switch 1432 indicating that crosspoint switch 1432 should apply the new switch configuration loaded previously (step 1908). Data output on signal 1438 then undergoes a phase change.
6. Fast acquisition control signal 1441 signal is held for a fixed period of time (e.g., 200 bit times), but in any case for a time sufficient for transmit CDR 1440 to relock to the phase change on signal 1438 (step 1910).
7. Fast acquisition control signal 1441 signal is deasserted (step 1912). Signal 1442 is now locked to signal 1438.
8. Fast acquisition control signal 1455 is asserted to receive CDR 1447, indicating to receive CDR 1447 that a phase change will occur on its input data signal (signal 1446) (step 1914). Fast acquisition control signal 1455 is asserted at the point at which the relocking pattern becomes present on signal 1446, as determined by the location of the framing pulse on switch framing pulse 1459.

9. Fast acquisition control signal 1455 is held for a fixed period of time (e.g., 400 bit times (200 bit times for relock of transmit CDR 1440 and 200 bit times for relock of receive CDR 1447)), but in any case for a time sufficient for receive CDR 1447 to begin receiving good data and to relock to the phase change on signal 1446 (step 1916).

10. Fast acquisition control signal 1455 is deasserted (step 1918). Signal 1449 is now locked to signal 1446 by this operation.

11. A pulse on switching signal 1457 is applied to crosspoint switch 1448 indicating that crosspoint switch 1448 should apply the new switch configuration loaded previously (step 1920). Signal 1450 then undergoes a phase change.

12. Fast acquisition control signal 1456 is asserted to transmit CDR 1451 and is held for a fixed period of time (e.g., 600 bit times (200 bit times each for transmit CDR 1440 and receive CDR 1447 relock, and 200 bit times for transmit CDR 1451 relock)), but in any case for a time sufficient for transmit CDR 1451 to begin receiving good data and to relock to the phase change on signal 1450 (step 1922).

13. Fast acquisition control signal 1456 is deasserted (step 1924). Signal 1453 is now locked to signal 1450 by this operation.

14. Fast acquisition control signal 1471 signal asserted to receive CDR 1463 and is held for a fixed period of time (e.g., 800 bit times (200 bit times for CT1, receive CDR 1447 and transmit CDR 1451 relock and 200 bit times for receive CDR 1463 relock)), but in any case for a time sufficient for receive CDR 1463 to begin receiving good data and to relock to the phase change on signal 1462 (step 1926).

15. Fast acquisition control signal 1471 signal is deasserted (step 1928). Signal 1465 is now locked to signal 1462 by this operation.

16. A pulse on switching signal 1473 is applied to crosspoint switch 1464 indicating that crosspoint switch 1464 should apply the new switch configuration loaded previously (step 1930). Signal 1466 then undergoes a phase change.

17. Fast acquisition control signal 1472 is asserted to transmit CDR 1467 and is held for a fixed period of time (e.g., 1000 bit times (200 bit times relock of transmit CDR 1440, receive CDR 1447, transmit CDR 1451, and receive CDR 1463 and 200 bit times for relock of transmit CDR 1467)) necessary for, transmit CDR 1467 to begin receiving good data and to relock to the phase change on signal 1466 (step 1932).

18. Fast acquisition control signal 1472 is deasserted (step 1934). Signal 1467 is now locked to signal 1466 by this operation.

19. LCTS reframing signal 1424 is driven low at the appearance of the relocking pattern on signal 1418 (step 1936). The clock recovered from signal 1420 is ignored at framer 1421.

20. Framer 1421 is held in a frozen state during the period of time that signal 1420 is unknown (step 1938).

21. Signal 1420 becomes good a period of time (e.g. 1250 bit times) after signal 1417 becomes known good (step 1940).

22. LCTS reframing signal 1424 signal is driven high at end of the relocking pattern on signal 1420 (step 1942).

23. Framer 1421 restarts the clocks extracted from signal 1420 (step 1944).

24. Framer 1421 reframes on the framing pattern of signal 1420 (e.g., "F") and begins passing data, completing the operation (step 1946).

Figure 20:
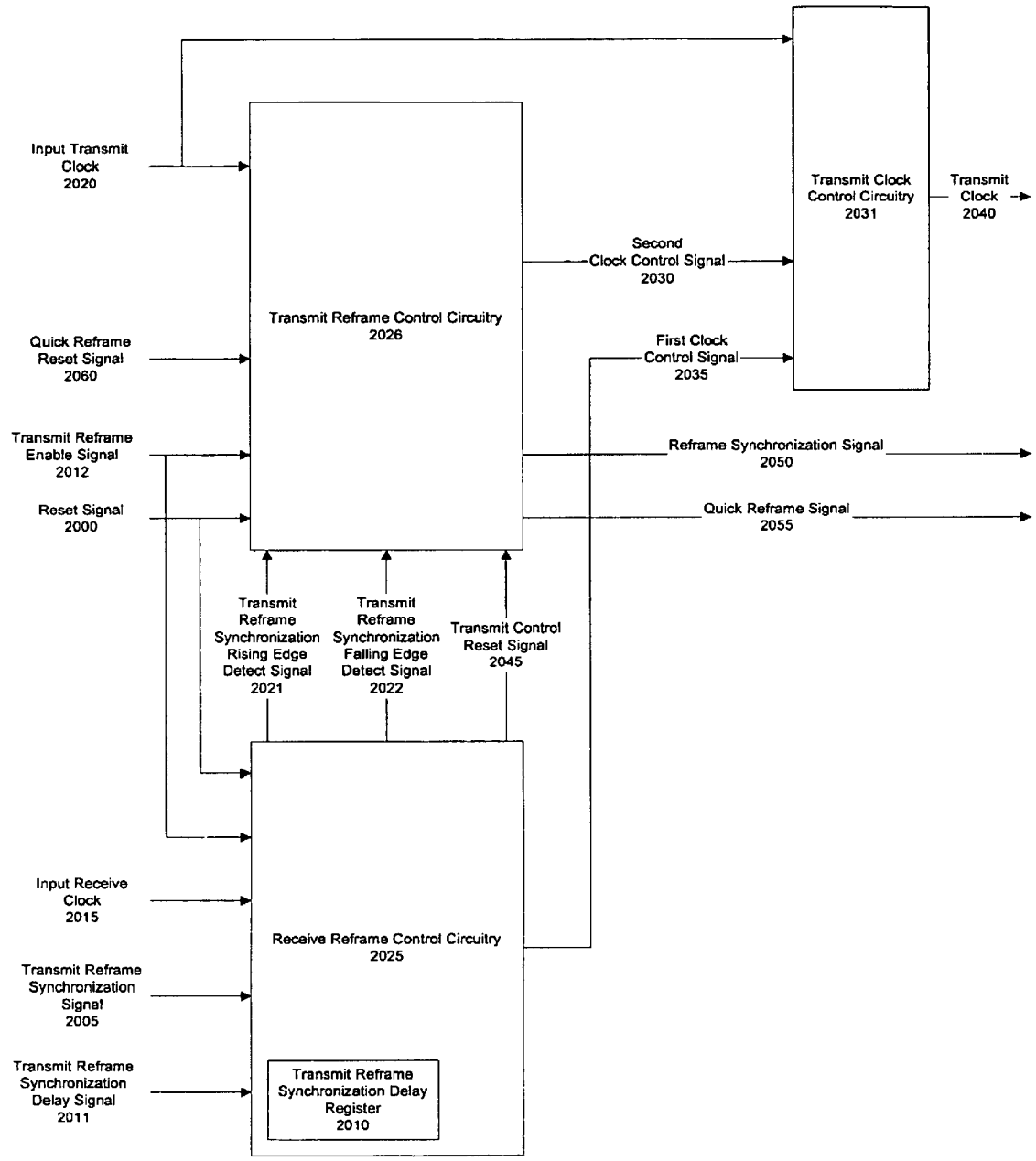
FIG. 20 illustrates components of a protocol processor configured to support errorless rearrangement.

FIG. 20 depicts exemplary components of protocol processor 420 that allow protocol processor 420 to support the errorless rearrangement functions described previously. Errorless matrix rearrangement support is provided in protocol processor 420 such that switch matrix 130 can be rearranged without causing any loss of data on active channels. Components supporting such functions include:

1. A reset signal 2000, which acts to set the control logic in a known state;
2. A transmit reframe synchronization signal 2005;
3. A transmit frame synchronization delay register 2010, loaded via a transmit frame synchronization delay signal 2011;
4. A transmit reframe enable control register bit (not shown), which is set according to a transmit reframe enable signal 2012;
5. Control logic employing the above signals and registers;
6. Synchronizers to sequence control signals between clock domains;
7. Gating logic to "freeze" input transmit clock 2020;
8. Logic to reinitialize the transmit input framer; and
9. Logic to allow immediate reframing in the presence of bit errors during the fast reframe operation.

Transmit reframe synchronization signal 2005 controls the sequencing of the errorless rearrangement operation. Transmit reframe synchronization signal 2005 is "observed" only if the transmit reframe enable bit is set. When the transmit reframe enable bit is clear, transmit reframe synchronization signal 2005 is ignored (i.e., the transmit reframe enable bit allows for a particular protocol processor/line card to avoid participation in an errorless rearrangement operation). System level implementation of errorless rearrangement is preferably such that line cards needing to participate in an errorless rearrangement operation are first configured (e.g., by setting the corresponding transmit reframe enable bits), and that a common "trigger" transmit reframe synchronization pulse is then delivered to all line cards in the system.

Transmit reframe synchronization signal 2005 is received relative to an input receive clock 2015. Input receive clock 2015 is used to handle transmit reframe synchronization because input transmit clock 2020 will become undefined during the course of the errorless rearrangement operation. Input receive clock 2015 is from the same frequency source as the transmit output clock (however, the phase relationship is unknown). Input receive clock 2015 signal should remain active and accurate during the errorless rearrangement. The majority of the control generated by transmit reframe synchronization signal 2005 is done in the domain of input receive clock 2015 and then critical control outputs are synchronized into the clock domain of input transmit clock 2020.

Transmit reframe synchronization signal 2005 is assumed to be asynchronous to input receive clock 2015. A rising edge detection circuit is used to detect the assertion of transmit reframe synchronization signal 2005 (employed in generating a transmit reframe synchronization rising edge detect signal 2021) and a falling edge detection circuit is used to detect the deassertion of transmit reframe synchronization signal 2005 (employed in generating a transmit reframe synchronization falling edge detect signal 2022).

The asserting and deasserting edges of transmit reframe synchronization signal 2005 are delayed internally by a count supplied in transmit frame synchronization delay register 2010 via transmit frame synchronization delay signal 2011. Counting using transmit frame synchronization delay register 2010 is performed in the clock domain of input receive clock 2015. When a rising edge is detected on transmit reframe synchronization signal 2005, the indication of assertion is not supplied to the internal control logic until a delay equal to the count stored in transmit frame synchronization delay register 2010 has expired. The count stored in transmit frame synchronization delay register 2010 is specified as the number of periods of input receive clock 2015 to be counted. When a falling edge is detected on transmit reframe synchronization signal 2005, the same transmit frame synchronization delay count is tallied before the deassertion of transmit reframe synchronization signal 2005 is indicated to the internal control logic.

The system timing of transmit reframe synchronization signal 2005 is such that there are guaranteed to be a number of good pulses of input transmit clock 2020 remaining at the input of input transmit clock 2020 (e.g., 20 periods of acceptable clock signal), after the "delay counted" rising edge detection of transmit reframe synchronization signal 2005 has been supplied to the internal control logic. Similarly, input transmit clock 2020 is guaranteed to be good for a given number of clock periods of input transmit clock 2020 (e.g., 20 periods of acceptable clock signal) before the first framing pattern is received, after the "delay counted" falling edge detection of transmit reframe synchronization signal 2005 has been supplied to the internal control logic.

To support the errorless rearrangement technique, the input/output connections to and from the matrix are maintained during a matrix rearrangement. Only paths internal to switching matrix 130 are altered during the rearrangement. As noted, switching matrix 130 incorporates several clock/data recovery units (CDRs) in the signal path from matrix input to matrix output. These CDRs are configured in a serial sequence through the matrix, such that when the serial data signal is disrupted (e.g., due to a switch change), the CDRs reacquire lock one at a time, in a serial fashion. During the period of time that the CDRs are re-acquiring lock, the "clock" into protocol processor 420 is of unknown frequency and period. The errorless rearrangement support circuitry in protocol processor 420 is responsible for "blocking" the transmit input clock during the rearrangement (when the clock is not known), turning the clock back on when the clock again becomes clean, and finally, to reframe to the newly received serial data stream immediately and begin passing data. The sequence of events that occur in performing an errorless rearrangement is now described.

Figure 21:
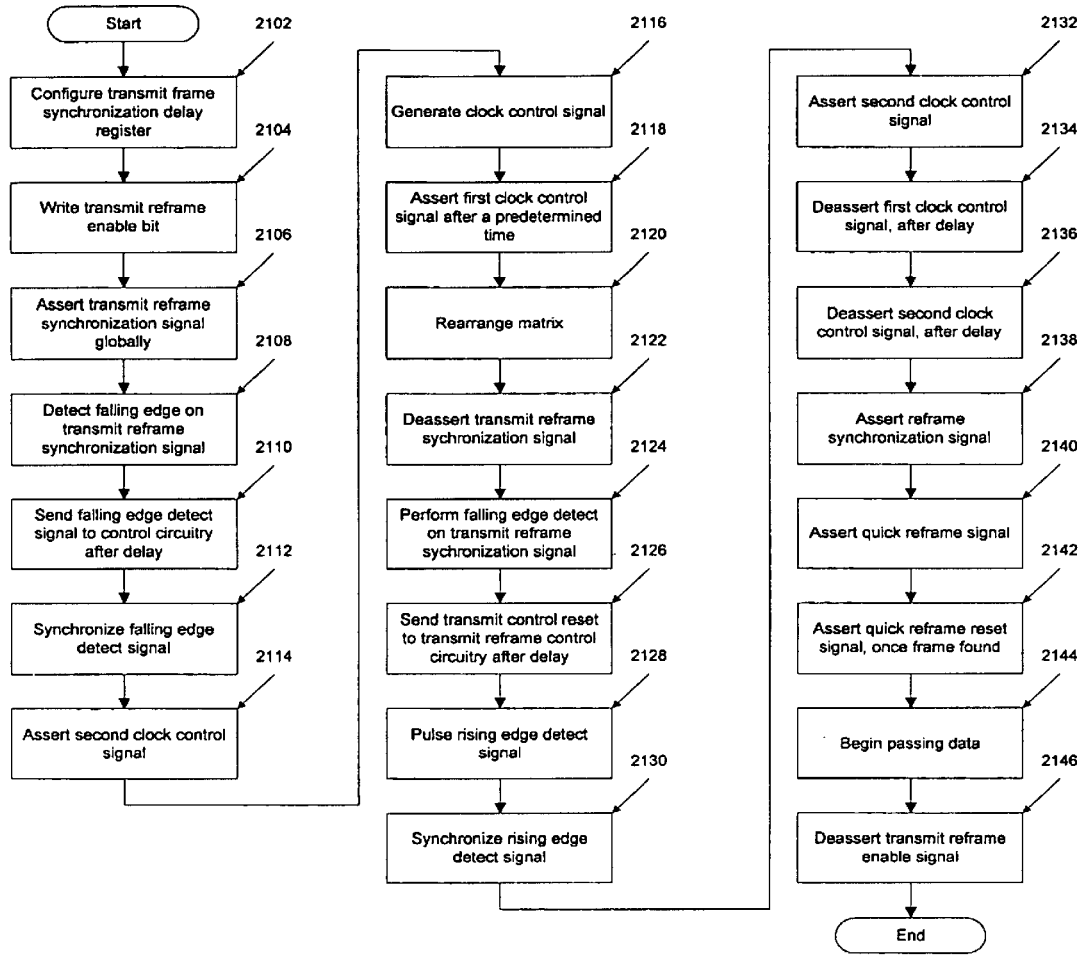
FIG. 21 illustrates a flow diagram depicting the actions performed in an errorless rearrangement operation within a protocol processor.

FIG. 21 illustrates a flow diagram depicting the actions performed in an errorless rearrangement within a protocol processor such as protocol processor 420 during an errorless rearrangement of matrix 130 of router 100.

1. First, transmit frame synchronization delay register 2010 is configured during system initialization with a value appropriate for the length of optical cable between the line card and the matrix (step 2102).
2. The transmit reframe enable bit is then written (e.g., with a logic 1) (step 2104).
3. Transmit reframe synchronization signal 2005 is asserted globally to all line cards in the system (step 2106). (Only line cards whose transmit reframe enable bits are set will actually perform the quick reframe errorless rearrangement operation.)
4. Receive reframe control circuitry 2025 detects a falling edge on transmit reframe synchronization signal 2005 (step 2108).
5. Receive reframe control circuitry 2025 counts the number of clocks of input receive clock 2015 indicated by the value held in transmit frame synchronization delay register 2010, then sends a pulse on transmit reframe synchronization falling edge detect signal 2022 (preferably two periods wide) to transmit reframe control circuitry 2026 (step 2110). A number of good clocks of input transmit clock 2020 (e.g., 20) are guaranteed to remain from this point in time.
6. Transmit reframe control circuitry 2026 then synchronizes transmit reframe synchronization falling edge detect signal 2022 to input transmit clock 2020 (step 2112).
7. Transmit reframe control circuitry 2026 asserts a second clock control signal 2030 (e.g., sets second clock control signal 2030 to a logic 1) on the rising edge of input transmit clock 2020 and provides second clock control signal 2030 to transmit clock control circuitry 2031 (step 2114).
8. Transmit clock control circuitry 2031 performs a logical "OR" of second clock control signal 2030 and a first clock control signal 2035 to generate clock control signal (not shown) (step 2116). First clock control signal 2035 is generated by receive reframe control circuitry 2025. The clock control signal is logically ORed with input transmit clock 2020 to inhibit a transmit clock 2040. This operation should inhibit transmit clock 2040 without creating "glitches".
9. After approximately four clock periods of input receive clock 2015, receive reframe control circuitry 2025 asserts first clock control signal 2035 (e.g., sets first clock control signal 2035 to a logical 1) (step 2118). This is done to maintain a predetermined value (e.g., a logical 1) on the clock control signal after input transmit clock 2020 becomes indeterminate during the rearrangement period.
10. Multiple bit times pass, during which the matrix switch is rearranged and the CDR's in the matrix path re-acquire lock (step 2120).
11. Transmit reframe synchronization signal 2005 is deasserted globally to all line cards in the system (step 2122).
12. Receive reframe control circuitry 2025 performs an edge detection on the rising edge of transmit reframe synchronization signal 2005 (step 2124).
13. Receive reframe control circuitry 2025 counts the number of clocks of input receive clock 2015 indicated by the value stored in transmit frame synchronization delay register 2010, then sends a transmit control reset signal 2045 (preferably one period wide) to transmit reframe control circuitry 2026 (step 2126). Input transmit clock 2020 should become "good" a given number clocks prior to the assertion of transmit control reset signal 2045 (e.g., at least 20). Transmit control reset signal 2045 is used to reset transmit reframe control circuitry 2026 to a known state.
14. After a given number of periods of input receive clock 2015 (e.g., one period), receive reframe control circuitry 2025 sends a pulse on transmit reframe synchronization rising edge detect signal 2021 (preferably two clock periods wide) to transmit reframe control circuitry 2026 (step 2128).

15. Transmit reframe control circuitry 2026 synchronizes transmit reframe synchronization rising edge detect signal 2021 to input transmit clock 2020 (step 2130).

16. Transmit reframe control circuitry 2026 asserts second clock control signal 2030 (e.g., sets second clock control signal 2030 a logic 1) on the rising edge of input transmit clock 2020 and provides second clock control signal 2030 to transmit clock control circuitry 2031 (step 2132). (At this time transmit clock 2040 is still off as a result of first clock control signal 2035 being asserted).

17. After approximately four clock periods of input receive clock 2015, receive reframe control circuitry 2025 deasserts first clock control signal 2035 (e.g., sets first clock control signal 2035 to a logic 0) (step 2134). It will be noted that, even after first clock control signal 2035 is deasserted, transmit clock 2040 remains off due to second clock control signal 2030 being asserted.

18. After approximately four clock periods of input transmit clock 2020, transmit reframe control circuitry 2026 deasserts second clock control signal 2030 (e.g., sets second clock control signal 2030 to a logic 0) on the rising edge of input transmit clock 2020 and sends second clock control signal 2030 to transmit clock control circuitry 2031 (step 2136). Within transmit clock control circuitry 2031, because both first clock control signal 2035 and second clock control signal 2030 are deasserted (e.g., set to logic 0), transmit clock 2040 starts running again (again, this operation should cause no "glitches" on transmit clock 2040).

19. Once transmit clock 2040 is running again, transmit reframe control circuitry 2026 asserts the first of two additional control signals, a reframe synchronization signal 2050 (step 2138). Reframe synchronization signal 2050 is a signal (preferably, two clock periods wide) that indicates to the framer in the transmit section that the framer should start looking for the framing information.

20. Transmit reframe control circuitry 2026 also asserts the second of these additional control signals, a quick reframe signal 2055 (step 2140). Quick reframe signal 2055, in one embodiment, is asserted (e.g., set to a logic 1) in order to force the given framer to look at only 16-bits of data (instead of the normal 32 bits). Quick reframe signal 2055 also indicates to the given framer that the framer is to accept up to a single bit error in every byte of framing overhead.

21. Once the frame has been found, the transmit framer sends back a reset signal (quick reframe reset signal 2060; preferably one clock period wide) to transmit reframe control circuitry 2026 in order to reset the quick reframe signal (e.g., back to a logic 0) (step 2142).

22. Because the frame boundary has been located, the system can begin passing data immediately, within the same frame (step 2144).

23. The transmit reframe enable bit is then deasserted by deasserting transmit reframe enable signal 2012, completing the errorless switching operation (from the perspective of the given protocol processor) (step 2146).

Software Architecture

In one embodiment, router 100 implements many functions in software to provide flexibility, support for communications protocols, and ease of implementation. The software architecture presented here forms a distributed management, control, and routing layer capable of spanning hundreds or thousands of nodes. The software architecture covers all protocol layers, management and control applications, and inter-node communication protocols and APIs.

The software modules described herein may be received by the various hardware modules of router 100, for example, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overall Architecture

The software running the various processors of router 100 normally includes three major components: operating system, inter-processor and inter-node communications, and management and control applications. The operating system should provide standard facilities for supporting program operation, communications, and system management tasks.

An important aspect of any software architecture is its underlying inter-process communications (IPC) mechanism. IPCs that provide for the isolation of tasks are preferable. Such IPCs use message passing as their preferred communication. Message passing allows for full, but isolated interaction among tasks. To the rest of the system, a task, no matter how complex, is reduced to a simple producer and consumer of messages. Such a software architecture provides a set of well defined services, each accessed through one or more messages. Though sometimes visible to other tasks, in one embodiment, none of a given task's variables and structures should be accessible outside its context. Limiting task interactions to message passing and keeping runtime variables private to each task allows individual software components to evolve independently and in parallel.

In order to keep code generic (i.e., system-and processor-independent), the message-based IPC should also provide a consistent application programming interface (API) that doesn't rely on any system-specific features or attributes. The API should have the same syntax and behavior, regardless of the underlying operating system, processor, or message-passing mechanism used. With certain generating systems, for example, message queues are used to implement the IPC, while on other kernels, pipes might be more appropriate. Preferably, then, the API should provide the following services to the application code:

1. Send message;
2. Receive a message;
3. Check for available messages; and
4. Name lookup and registration.

The last service, name lookup and registration, makes it possible for communicating entities to reference one another using names rather than task ID's, which are system-dependent.

Resource Manager

A resource manager (RM) is the software module responsible for collecting information about available resources and monitoring their status during normal system operation. A resource is used generically in this document to refer to any manageable hardware element that performs one or more system functions. The RM builds its resource list from unsolicited information received from other modules in the system, and from periodic keep-alive messages exchanged with those modules. The RM, for example, is the first system application notified of card failures, insertions, and removals.

In one embodiment of router 100, there are two RM versions in the system. The first, which runs on the level-1 processor, is responsible for managing system resources and, in some cases, network-wide resources. The other version, which runs on level-2 processors, is responsible for managing resources in a single shelf. This multi-level hierarchy creates a flexible and expandable system where lower-level resource managers are custom designed for the specific shelf controlled.

The RM maintains information about a given resource in a structure called the Resource Control Block (RCB). The RCB consists of two main sections: a generic section, which is the same for all resources regardless of type, and a resource-specific section that varies according to resource type. All resource managers maintain a hierarchical list of resource control blocks that represents resources under their control. The list is referred to herein as the resource list and reflects the resources' hierarchy and their interdependencies. This allows the RM to determine, relatively quickly, the effect a given resource's failure has on other members of the hierarchy.

The router 100 preferably runs one or more versions of the Unix operating system on the level-1 processor and the level-2 processors (in the I/O and matrix shelves). Level-2 processors preferably run a real-time version of the Unix operating system (OS). Other processors (e.g., level-3, route, quad, and matrix-node processors) preferably run a single task that does not require the services of an operating system or kernel. While Unix operating systems are described herein as being preferable, any one or a number of operating systems may be used.

System Controller

The system controller is responsible for overall system management and control. The system controller uses a variety of protocols to communicate with other nodes in the network, including the operating system (OS). Some of the protocols satisfy specific requirements (e.g., in a SONET based system, the transfer of OAM&P message across the SONET/SDH communications channels DCC), while others implement features, or functions, that are not part of the physical protocol used. To facilitate these functions, every router (one router, two, etc.) in a network is assigned an ID that uniquely identifies the given router within the network. The ID can also serve as a priority metric that determines the node's level within the hierarchy. However, the network can be configured to allow the user to override this by manually assigning priorities to network nodes. The system controller supports a number of tasks that perform management, control, and routing functions, including resource management, OS interfacing, various network protocol servers, and operations, control, and intermediate system services.

Matrix Shelf Processor

The matrix shelf processor is responsible for the overall operation of a single main matrix shelf. The matrix shelf processor communicates with the system controller, the route processor, and the microcontroller on each of the switch nodes, to provide local control and management for the shelf, including matrix configuration, diagnostics, and error reporting. The software on the matrix shelf processor preferably runs under a real-time Unix operating system. The RM on the matrix shelf processor is responsible for managing the hardware resources in its shelf. Like other resource managers in the system, the level-2 manager on this module uses a combination of hardware and software to discover and maintain a list of available shelf resources. A protocol may be implemented to support such messaging.

In one embodiment, fault isolation is implemented by a dedicated task that is responsible for locating failures within the shelf. In a SONET based implementation, the software running on the shelf processor, with help from the microcontroller on the switch node, to determine(s) the quality of any of the input signals.

Line Card Processor

The I/O Module terminates an input signal from one of the other nodes in the network. For example, in a SONET-based implementation, a single SONET/SDH OC-48 signal is terminated by an I/O module, although other signal levels (OC-192, OC-12, and so on) may be supported. In one embodiment, the software consists of two threads, one that runs in the background and is responsible for non-time critical tasks. The other thread, which runs at the interrupt level, is responsible for all real-time aspects of the software, including limited overhead processing, alarm detection and forwarding, and fault detection and recovery. The I/O module maintains a copy of its firmware and startup code onboard.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of operating a switch matrix comprising:
    configuring said switch matrix to couple a first input to a first output;
    receiving an information stream at said first input, wherein said information stream comprises a plurality of portions in a sequence identifying a portion of said plurality of portions comprising an overhead byte,
    wherein said portion is in one position in said sequence; and
    reconfiguring said switch matrix during a first time period in response to said identifying, wherein said first time period corresponds to said one position in said sequence.

2. The method of claim 1, wherein said reconfiguring couples said first input to a second output.

3. The method of claim 2, wherein said switch matrix is a rearrangeably non-blocking switch matrix.

4. The method of claim 2, wherein said switching matrix is a CLOS switching matrix.

5. The method of claim 4, wherein said method avoids generating an error in other information streams transiting said switch matrix during said reconfiguring.

6. The method of claim 2, further comprising:
    re-arranging certain ones of said plurality of portions such that said portion is in another position in said sequence, wherein said first time period corresponds instead to said another position.

7. The method of claim 6, wherein said information stream is a SONET frame.

8. The method of claim 6, wherein said portion comprises network protocol overhead.

9. The method of claim 6, wherein said information stream is carried by a signal, said method further comprising:
loading said portion with a value, said value enabling said switch matrix to synchronize with said signal more easily.

10. The method of claim 2, wherein a number of said plurality of portions are in various positions in said sequence, said number of said plurality of portions including said portion, said method further comprising:
re-arranging certain ones of said plurality of portions prior to said receiving such that said number of said plurality of portions are in a set of contiguous positions, wherein said first time period corresponds to said set of contiguous positions.

11. The method of claim 10, further comprising:
re-arranging said certain ones of said plurality of portions such that said number of said plurality of portions are in their original positions.

12. The method of claim 11, further comprising:
reading protocol information from said portion during said re-arranging certain ones of said plurality of portions prior to said receiving;
processing said protocol information to derive new protocol information;
writing said new protocol information to said portion during said re-arranging said certain ones of said plurality of portions such that said number of said plurality of portions are in their original positions.

13. A method of operating a switch matrix comprising:
configuring said switch matrix to couple a plurality of inputs to a plurality of outputs;
receiving a plurality of information streams at said plurality of inputs, wherein
each one of said plurality of information streams comprises a plurality of portions in a sequence and is received at a corresponding one of said plurality of inputs;
for each one of said plurality of information streams,
identifying a portion of said plurality of portions comprising an overhead
byte wherein said portion is in one position in said sequence; defining a switching period in response to said identifying; and
reconfiguring said switch matrix during said switching period.

14. The method of claim 13, wherein said time switching period comprises a period of minimal concurrency between a time period for each of said plurality of information streams corresponding to said one position in said sequence, and said period of minimal concurrency is such that, for said each one of said plurality of information streams, a leading edge of said portion has been output from a corresponding one of said plurality of outputs before a trailing edge of said portion is received at said corresponding one of said plurality of inputs.

15. The method of claim 13, wherein said configuring couples one of said plurality of inputs to a one of said plurality of outputs and said reconfiguring couples said one of said plurality of inputs to another of said plurality of outputs.

16. The method of claim 13, wherein said switch matrix is a rearrangeably non-blocking switch matrix.

17. The method of claim 14, further comprising:
for certain ones of said plurality of information streams, re-arranging certain ones of said plurality of portions such that said portion is moved to another position in said sequence of said plurality of information streams in order to achieve said period of minimal concurrency.

18. The method of claim 13, wherein, for certain ones of said plurality of information streams, a number of said plurality of portions are in various positions in said sequence, said number of said plurality of portions including said portion, said method further comprising,:
for said certain ones of said plurality of information streams, re-arranging certain ones of said plurality of portions prior to said receiving such that said number of said plurality of portions are in a set of contiguous positions, wherein a group time period during which said number of said plurality of portions transits said switching matrix is at least minimally concurrent with said group time period for each other one of said certain ones of said plurality of information streams.

19. The method of claim 18, further comprising:
for said certain ones of said plurality of information streams, re-arranging said certain ones of said plurality of portions such that said number of said plurality of portions are in their original positions.

20. A switching apparatus comprising:
a switching matrix, having a matrix input, a control input, and a plurality of matrix outputs, wherein said switching matrix is configured to receive an information stream at said matrix input, said information stream comprising a plurality of portions; and
control circuitry, having a control output coupled to said control input, wherein said control circuitry is configured to initially configure said switching matrix to output said information stream at a one of said plurality of matrix outputs, identify a portion of said plurality of portions comprising an overhead byte, and
switching matrix to output said information stream at another of said plurality of matrix outputs during a period of time during which said portion is transiting said switching matrix.

21. The switching apparatus of claim 20, further comprising:
an input resequencing circuit, having a resequencer input and a resequencer output coupled to said matrix input, wherein said input resequencing circuit is configured to receive said information stream at said resequencer input,
rearrange certain ones of said plurality of portions such that a one of said plurality of portions is moved from an original position in an original sequence of said plurality of portions to another position in said original sequence in order to produce a modified sequence of said plurality of portions, and
provide said information stream to said switching matrix at said input resequencer output.

22. The switching apparatus of claim 21, further comprising:
a first output resequencing circuit, coupled to said one of said plurality of matrix outputs, wherein said first output resequencing circuit is configured to move said portion from an original position in said modified sequence to a position in said modified sequence corresponding to said original position in said original sequence; and a second output resequencing circuit, coupled to said another of said plurality of matrix outputs, wherein said second output resequencing circuit is configured to move said portion from an original position in said modified sequence to a position in said modified sequence corresponding to said original position in said original sequence.

23. The switching apparatus of claim 20, further comprising:

an input resequencing circuit, having a resequencer input and a resequencer output coupled to said matrix input, wherein said first resequencing circuit is configured to receive said information stream at said resequencer input, rearrange certain ones of said plurality of portions such that a number of said plurality of portions occupy a set of contiguous positions in a sequence of said plurality of said portions, and provide said information to said switching matrix at said first resequencing output, said number of said plurality of portions including said portion and said subsequent configuration of said switching matrix occurs instead during a period of time during which said number of said plurality of portions is transiting said switching matrix.

24. The switching apparatus of claim 20, wherein said switching matrix is a re-arrangeably non-blocking switching matrix.

25. The switching apparatus of claim 20, wherein said portion expendable.

26. The switching apparatus of claim 20, wherein said portion contains protocol overhead information.

27. The switching apparatus of claim 20, wherein said matrix input is one of a plurality of matrix inputs, said information stream is one of a plurality of information streams, each one of said plurality of information streams is received at a corresponding one of said plurality of matrix inputs, said control circuitry is further configured to further initially configure said switching matrix to couple each one of said plurality of matrix inputs to a corresponding one of said plurality of matrix outputs, and no errors occur in said plurality of information streams as a result of said subsequent configuration of said switching matrix.

28. The switching apparatus of claim 20, wherein said subsequent configuration of said control circuitry occurs in response to commands from control software running on said control circuitry.

29. The switching apparatus of claim 20, wherein said subsequent configuration of said control circuitry occurs in response to commands from control software running on a route processor coupled to said control circuitry.

30. A switching apparatus comprising:

an input resequencing circuit, having a resequencer input and a resequencer output, wherein said input resequencing circuit is configured to receive an information stream comprising a plurality of portions at said resequencer input, each one of said plurality of portions comprising a plurality of sub-portions, and move a one of said plurality of sub-portions of said each one of said plurality of portions from an original position in a sequence of said each one of said plurality of portions to another position in said sequence, and output said information stream at said resequencer output;

a switching matrix, having a matrix input coupled to receive said information stream from said resequencer output, a control input, and a plurality of matrix outputs; and control circuitry, having a control output coupled to said control input, wherein said control circuitry is configured to identify, for each of said plurality of portions, said one of said plurality of sub-portions comprising an overhead byte, and cause said switching matrix to switch said information stream from said one of said plurality of matrix outputs to another of said plurality of matrix outputs during a period of time corresponding to said another position.

31. The switching apparatus of claim 30, further comprising:

a first output resequencing circuit, coupled to said one of said plurality of matrix outputs and configured to move said one of said plurality of sub-portions of said each one of said plurality of portions from said another position in said sequence to said original position in said sequence; and a second output resequencing circuit, coupled to said another of said plurality of matrix outputs and configured to move said one of said plurality of sub-portions of said each one of said plurality of portions from said another position in said sequence to said original position in said sequence.

32. The switching apparatus of claim 30, wherein said switching matrix is a re-arrangeably non-blocking switching matrix.

33. The switching apparatus of claim 30, wherein said one of said plurality of sub-portions is expendable.

34. The switching apparatus of claim 30, wherein said one of said plurality of sub-portions contains protocol overhead information.

35. A method of operating a switch matrix comprising:

configuring said switch matrix to couple a first input to a first output;

receiving an information stream at said first input, wherein said information stream contains data and metadata within a plurality of portions in a sequence and a one of said plurality of portions is in one position in said sequence;

identifying said one of said plurality of portions as containing metadata; and reconfiguring said switch matrix during a first time period, said first time period corresponding to said one position in said sequence.

* * * * *

UNITED STATES PATENT AND TRADEMARK OFFICE
CERTIFICATE OF CORRECTION

| | | |
|---|---|---|
| PATENT NO. | : 6,982,974 B1 | Page 1 of 1 |
| APPLICATION NO. | : 09/477166 | |
| DATED | : January 3, 2006 | |
| INVENTOR(S) | : Saleh et al. | |

It is certified that error appears in the above-identified patent and that said Letters Patent is hereby corrected as shown below:

On the Title Page, Item (75) Inventors:, after "Lane" please delete "Bryon" and insert --Byron--

At Column 36, line 49 after "sequence" please insert --;--

At Column 39, line 19 after "information" please insert --stream--

At Column 39, line 22 after "portion" please insert --,--

At Column 39, line 30 after "portion" please insert --is--

At Column 40, line 49 after "contains" please delete "data and metada within"

At Column 40, line 51 after "sequence" please delete "and a one of said plurality of portions is in one position in said sequence"

At Column 40, line 53 after "identifying" please delete "said one" and insert --a portion of--

At Column 40, line 54 after "containing" please delete "metadata" and insert --an overhead byte, wherein said portion is in one position in said sequence--

Signed and Sealed this
Twelfth Day of March, 2013

Teresa Stanek Rea
*Acting Director of the United States Patent and Trademark Office*